US009598997B2

(12) United States Patent
Itoh et al.

(10) Patent No.: US 9,598,997 B2
(45) Date of Patent: Mar. 21, 2017

(54) EXHAUST GAS PURIFICATION APPARATUS OF INTERNAL COMBUSTION ENGINE

(71) Applicant: TOYOTA JIDOSHA KABUSHIKI KAISHA, Toyota-shi, Aichi-ken (JP)

(72) Inventors: Kazuhiro Itoh, Mishima (JP); Hiromasa Nishioka, Susono (JP); Yoshihisa Tsukamoto, Susono (JP); Hiroshi Ohtsuki, Gotenba (JP); Yasumasa Notake, Susono (JP); Hiroki Murata, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/945,951

(22) Filed: Nov. 19, 2015

(65) Prior Publication Data

US 2016/0153335 A1    Jun. 2, 2016

(30) Foreign Application Priority Data

Nov. 27, 2014  (JP) ................. 2014-240280

(51) Int. Cl.
*F01N 3/20* (2006.01)
*B01D 53/94* (2006.01)

(52) U.S. Cl.
CPC ......... *F01N 3/208* (2013.01); *B01D 53/9431* (2013.01); *B01D 53/9495* (2013.01); *F01N 3/2066* (2013.01); *B01D 2251/2062* (2013.01); *F01N 2240/40* (2013.01); *F01N 2260/024* (2013.01); *F01N 2560/06* (2013.01);

(Continued)

(58) Field of Classification Search
None
See application file for complete search history.

(56) References Cited

U.S. PATENT DOCUMENTS

| 2001/0016183 A1 | 8/2001 | Hofmann et al. |
| 2011/0219754 A1 | 9/2011 | Itoh |

FOREIGN PATENT DOCUMENTS

| JP | 2002-522328 | 7/2002 |
| JP | 2004-202450 | 7/2004 |

(Continued)

OTHER PUBLICATIONS

Takeda et al. JP2004202450A-translated document, 2004.*

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An exhaust gas purification apparatus of an internal combustion engine includes: a reducing agent passage that connects a tank and an injection valve; a heater that heats up a hydrolysis catalyst that is provided in the reducing agent passage; and a controller comprising at least one processor configured to control a pump so that a reducing agent located further toward a side of the injection valve than the hydrolysis catalyst flows toward a side of the hydrolysis catalyst after completion of injection of a reducing agent in a state where the hydrolysis catalyst is at a temperature lower than the hydrolysis temperature and before start of injection of a reducing agent in a state where the hydrolysis catalyst is at a temperature equal to or higher than the hydrolysis temperature.

6 Claims, 15 Drawing Sheets

(52) U.S. Cl.
CPC ...... *F01N 2610/02* (2013.01); *F01N 2610/10* (2013.01); *F01N 2610/105* (2013.01); *F01N 2610/14* (2013.01); *F01N 2610/144* (2013.01); *F01N 2610/146* (2013.01); *F01N 2610/1473* (2013.01); *F01N 2900/1404* (2013.01); *F01N 2900/1602* (2013.01); *F01N 2900/1626* (2013.01); *F01N 2900/1631* (2013.01); *F01N 2900/1808* (2013.01); *F01N 2900/1811* (2013.01)

(56) References Cited

FOREIGN PATENT DOCUMENTS

| | | | |
|---|---|---|---|
| JP | 2004202450 A | * | 7/2004 |
| WO | WO 2011/108110 A1 | | 9/2011 |

* cited by examiner

EXHAUST GAS PURIFICATION APPARATUS OF INTERNAL COMBUSTION ENGINE

CROSS REFERENCE TO RELATED APPLICATIONS

This application claims priority to Japanese Patent Application No. 2014-240280 filed on Nov. 27, 2014, the entire contents of which are incorporated by reference herein.

BACKGROUND OF THE INVENTION

1. Field of the Invention

The present invention relates to an exhaust gas purification apparatus of an internal combustion engine.

2. Description of the Related Art

A selective catalytic reduction NOx catalyst (hereinafter, also referred to as an SCR catalyst) is known to be provided in an exhaust passage of an internal combustion engine. The SCR catalyst is a catalyst that selectively reduces NOx using a reducing agent. In addition, a technique is known in which a liquid injection valve that supplies a liquid reducing agent and a gas injection valve that supplies a gas reducing agent are respectively provided on an upstream side of an SCR catalyst and either the gas reducing agent or the liquid reducing agent is injected in accordance with an operating state of an internal combustion engine or the like (for example, refer to Patent Document 1).

PRIOR ART DOCUMENT

Patent Document

[Patent Document 1] 2011/108110
[Patent Document 2] Japanese patent laid-open publication No. 2004-202450
[Patent Document 3] Published Japanese Translation No. 2002-522328 of PCT International Publication

SUMMARY OF THE INVENTION

In this case, by respectively providing a gas injection valve and a liquid injection valve, apparatus size increases. In consideration thereof, a liquid reducing agent and a gas reducing agent can conceivably be respectively injected from one injection valve. However, for example, when injecting the gas reducing agent after injecting the liquid reducing agent, there may be cases where the liquid reducing agent remains in the injection valve upon injecting the gas reducing agent. In this case, the liquid reducing agent remaining in the injection valve is first injected and, subsequently, the gas reducing agent is injected. The same applies to a case where the liquid reducing agent is injected after injecting the gas reducing agent.

In addition, it is also conceivable to differently use and inject two different liquid reducing agents from one injection valve in accordance with the circumstances. Even in such a case, a reducing agent of a different type remaining in the injection valve is to be injected first. Therefore, even if the intention is to supply a best reducing agent in accordance with the circumstances at the time, a reducing agent which remains in the injection valve and which is not necessary the best reducing agent ends up being supplied as well.

The present invention has been made in consideration of the problems described above and an object thereof is to prevent, when injecting a reducing agent from an injection valve capable of supplying a plurality of types of reducing agents, a reducing agent of a different type to an intended reducing agent from being injected.

In order to achieve the object described above, an exhaust gas purification apparatus of an internal combustion engine according to the present invention includes: a selective catalytic reduction NOx catalyst that is provided in an exhaust passage of the internal combustion engine and that selectively reduces NOx in exhaust gas using a reducing agent; a tank that stores a liquid ammonia precursor, which is a reducing agent; an injection valve that is provided in an exhaust passage on an upstream side of the selective catalytic reduction NOx catalyst and that injects a reducing agent; a reducing agent passage that connects the tank and the injection valve with each other; a hydrolysis catalyst that is provided in the reducing agent passage and that hydrolyzes the ammonia precursor; a heater configured to heat up the hydrolysis catalyst to a temperature equal to or higher than a hydrolysis temperature at which the ammonia precursor hydrolysis is hydrolyzed; a pump that discharges a reducing agent; and a controller comprising at least one processor configured to control the heater and the pump, wherein the controller comprising at least one processor configured to control the pump so that, when injecting a reducing agent from the injection valve in a state where the hydrolysis catalyst is at a temperature equal to or higher than the hydrolysis temperature after injecting a reducing agent from the injection valve in a state where the hydrolysis catalyst is at a temperature lower than the hydrolysis temperature, a reducing agent located further toward a side of the injection valve than the hydrolysis catalyst flows toward a side of the hydrolysis catalyst after completion of injection of a reducing agent from the injection valve in a state where the hydrolysis catalyst is at a temperature lower than the hydrolysis temperature and before start of injection of a reducing agent from the injection valve in a state where the hydrolysis catalyst is at a temperature equal to or higher than the hydrolysis temperature.

In this case, by injecting an ammonia precursor that is a reducing agent into exhaust gas after performing hydrolysis, the ammonia precursor is converted into ammonia at a lower temperature. Therefore, NOx can be purified even when a temperature inside an exhaust passage and a temperature of the selective catalytic reduction NOx catalyst (SCR catalyst) are lower. On the other hand, after the temperature inside an exhaust passage sufficiently rises, conversion to ammonia occurs even with a reducing agent not subjected to hydrolysis. Therefore, once the temperature inside an exhaust passage sufficiently rises, consumption of energy required by hydrolysis can be reduced by injecting a reducing agent not subjected to hydrolysis. In addition, when a reducing agent subjected to hydrolysis is injected after the temperature inside an exhaust passage sufficiently rises, the reducing agent ends up being converted to ammonia at an early stage and, in some cases, concentration of the reducing agent in exhaust gas may become non-uniform. Therefore, one of a reducing agent not subjected to hydrolysis and a reducing agent after being subjected to hydrolysis is selected in accordance with the circumstances and the one reducing agent is injected from one injection valve. In such a case, the reducing agent not subjected to hydrolysis may be injected after injecting the reducing agent subjected to hydrolysis.

After injecting the reducing agent not subjected to hydrolysis, the reducing agent not subjected to hydrolysis remains at a location further toward a side of the injection valve than the hydrolysis catalyst. Hereinafter, the reducing agent remaining at a location further toward a side of the injection valve than the hydrolysis catalyst will also be referred to as a residual reducing agent. In addition, when attempting to inject the reducing agent subjected to hydrolysis in this state, the residual reducing agent not subjected to hydrolysis ends up being injected first. Furthermore, if the residual reducing agent not subjected to hydrolysis is injected first when the temperature inside the exhaust passage is low, the reducing agent may change to deposited matter that is deposited on the SCR catalyst without being converted to ammonia. Moreover, when the reducing agent changes to deposited matter without being converted to ammonia, there is a risk of a decline in NOx purification rate due to a decrease in an adsorption amount of the reducing agent by the SCR catalyst as well as deterioration of the SCR catalyst due to the deposited matter.

On the other hand, in the present invention, when injecting a reducing agent from the injection valve in a state where the hydrolysis catalyst is at a temperature equal to or higher than a hydrolysis temperature after injecting a reducing agent from the injection valve in a state where the hydrolysis catalyst is at a temperature lower than the hydrolysis temperature, a reducing agent located further toward a side of the injection valve than the hydrolysis catalyst is caused to flow toward a side of the hydrolysis catalyst after completion of injection of a reducing agent from the injection valve in a state where the hydrolysis catalyst is at a temperature lower than the hydrolysis temperature and before start of injection of a reducing agent from the injection valve in a state where the hydrolysis catalyst is at a temperature equal to or higher than the hydrolysis temperature. In other words, the residual reducing agent not subjected to hydrolysis is caused to flow toward a side of the hydrolysis catalyst after completion of the injection of a reducing agent not subjected to hydrolysis and before start of the injection of a reducing agent subjected to hydrolysis. in this case, the reducing agent flows in an opposite direction to a direction in which a reducing agent is injected from the injection valve. In other words, the residual reducing agent is caused to backflow toward the hydrolysis catalyst. In this case, when at least a part of the residual reducing agent not subjected to hydrolysis flows into the hydrolysis catalyst; the residual reducing agent can be hydrolyzed at the hydrolysis catalyst. Therefore, the reducing agent not subjected to hydrolysis can be prevented from being injected at a next injection of a reducing agent. In other words, by causing at least a part of the residual reducing agent not subjected to hydrolysis to flow into the hydrolysis catalyst after injecting a reducing agent not subjected to hydrolysis, the residual reducing agent having flowed into the hydrolysis catalyst can be hydrolyzed. Moreover, the hydrolysis of the residual reducing agent can be performed while the residual reducing agent flows (passes) through the hydrolysis catalyst or after temporarily storing the residual reducing agent in the hydrolysis catalyst. In addition, at a location further toward the side of the injection valve than the hydrolysis catalyst, the residual reducing agent not subjected to hydrolysis decreases by an amount of the residual reducing agent having flowed into the hydrolysis catalyst. Therefore, when the reducing agent subjected to hydrolysis is next injected, the residual reducing agent not subjected to hydrolysis can be prevented from being injected first. Moreover, the residual reducing agent may be caused to flow toward the hydrolysis catalyst at any time between completion of the injection of a reducing agent from the injection valve in a state where the hydrolysis catalyst is at a temperature lower than the hydrolysis temperature and start of the injection of a reducing agent from the injection valve in a state where the hydrolysis catalyst is at a temperature equal to or higher than the hydrolysis temperature.

In addition, the controller may perform heating of the hydrolysis catalyst wish the neater when she temperature inside the exhaust passage is lower than a prescribed temperature and may not perform heating of the hydrolysis catalyst with the heater when the temperature inside the exhaust passage is equal to or higher than the prescribed temperature.

As described above, a NOx purification rate at an SCR catalyst may vary between a case where a reducing agent subjected to hydrolysis is injected and a case where a reducing agent not subjected to hydrolysis is injected. When the temperature inside the exhaust passage is lower than a prescribed temperature, injecting a reducing agent that is converted to ammonia at a lower temperature is advantageous in terms of improving the NOx purification rate. In other words, when the temperature inside the exhaust passage is lower than the prescribed temperature, the NOx purification rate can be improved by supplying a reducing agent subjected to hydrolysis. On the other hand, if the reducing agent subjected to hydrolysis is injected when the temperature inside the exhaust passage is equal to or higher than the prescribed temperature, the reducing agent ends up being gasified at an early stage and concentration of the reducing agent may become non-uniform. In addition, when power is necessary to perform hydrolysis, fuel economy may decline due to hydrolysis of the reducing agent. Therefore, it is not favorable to always perform hydrolysis of the reducing agent. In consideration thereof, when the temperature inside the exhaust passage is equal to or higher than the prescribed temperature, the NOx purification rate can be improved by actually supplying a reducing agent not subjected to hydrolysis. Furthermore, a decline in fuel economy can be prevented by not heating the hydrolysis catalyst. The prescribed temperature may be set to a temperature at which a reducing agent not subjected to hydrolysis by the hydrolysis catalyst can be hydrolyzed to ammonia or to a temperature at which a NOx purification rate at the SCR catalyst is higher when injecting a reducing agent not subjected to hydrolysis by the hydrolysis catalyst as compared to injecting a reducing agent subjected to hydrolysis by the hydrolysis catalyst.

In addition, when the controller controls the pump so that a reducing agent located further toward a side of the injection valve than the hydrolysis catalyst flows toward the hydrolysis catalyst, the controller can operate the pump until all the reducing agent located further toward the side of the injection valve than the hydrolysis catalyst moves to a side of the tank from a hydrolysis catalyst including the hydrolysis catalyst.

If even a part of the residual reducing agent moves to the hydrolysis catalyst, an amount of the reducing agent not subjected to hydrolysis can be reduced. Furthermore, by moving all of the residual reducing agent to the hydrolysis catalyst, a reducing agent passage located further toward the side of the tank than the hydrolysis catalyst, or the tank, all of the residual reducing agent can be hydrolyzed. In addition, a state is created where a reducing agent does not exist at a location further toward the side of the injection valve than the hydrolysis catalyst. Therefore, a reducing agent not subjected to hydrolysis can be further prevented from being injected.

In addition, the reducing agent passage can include a first passage and a second passage which branch at a branching part and which join at a joining part, the hydrolysis catalyst can be provided in the second passage, at least one of the branching part and the joining part can includes a switching valve which switches a flow path of a reducing agent, the controller can control the switching valve and perform heating of the hydrolysis catalyst by the heater when a temperature inside the exhaust passage is lower than a prescribed temperature so that a reducing agent flows through the second passage and moreover can control the switching valve when the temperature inside the exhaust passage is equal to or higher than the prescribed temperature so that a reducing agent flows through the first passage, and when injecting a reducing agent from the injection valve in a state where the hydrolysis catalyst is at a temperature equal to or higher than the hydrolysis temperature after injecting a reducing agent from the injection valve in a state where the hydrolysis catalyst is at a temperature lower than the hydrolysis temperature, the controller can further control the switching valve so that a reducing agent flows through the second passage and control the pump so that a reducing agent located further toward a side of the injection valve than the joining part flows into at least the hydrolysis catalyst after completion of injection of a reducing agent from the injection valve in a state where the hydrolysis catalyst is at a temperature lower than the hydrolysis temperature and before start of injection of a reducing agent from the injection valve in a state where the hydrolysis catalyst is at a temperature equal to or higher than the hydrolysis temperature.

In this configuration, a first passage not including a hydrolysis catalyst and a second passage including a hydrolysis catalyst are provided in parallel. A reducing agent having flowed through the first passage not including a hydrolysis catalyst is injected from the injection valve in a state where hydrolysis is not performed and a reducing agent having flowed through the second passage including a hydrolysis catalyst is injected from the injection valve in a state where hydrolysis is performed. When causing a reducing agent to flow via the first passage, a reducing agent, not subjected to hydrolysis remains inside a reducing agent passage located further toward a side of the injection valve than a joining part or inside the injection valve after injection of a reducing agent is stopped. When the switching valve is switched in this state to cause a reducing agent to flow through the second passage, a reducing agent not subjected to hydrolysis remaining at a location further toward a side of the injection valve than the joining part ends up being injected first. In contrast, by causing a backflow to a side of the second passage of a reducing agent having flowed through the first passage and located further toward a side of the injection valve than the joining part, a reducing agent not subjected to hydrolysis reaches the hydrolysis catalyst. Accordingly, hydrolysis of a reducing agent having flowed through the first passage and remaining at a location further toward a side of the injection valve than the joining part can be performed. Therefore, when causing a reducing agent to flow via the second passage, a reducing agent not subjected to hydrolysis can be prevented from being injected. Moreover, when causing a backflow of a reducing agent, a pump may be operated until at least a part of a reducing agent located further toward a side of the injection valve than the joining part reaches the hydrolysis catalyst. Alternatively, the pump may be operated until ail of the reducing agent located further toward the side of the injection valve than the joining part moves to a side of a tank from a hydrolysis catalyst including the hydrolysis catalyst.

The controller can heat the hydrolysis catalyst by the heater when controlling the pump so that a reducing agent located further toward side of the injection valve than the hydrolysis catalyst flows toward a side of the hydrolysis catalyst.

By heating the hydrolysis catalyst when causing a backflow of a reducing agent not subjected to hydrolysis through the second passage, a reducing agent subjected to hydrolysis can be immediately injected when next supplying a reducing agent. Alternatively, a reducing agent having flowed back to the hydrolysis catalyst can be stored without being subjected to hydrolysis, whereby hydrolysis can be performed by heating the hydrolysis catalyst when next supplying a reducing agent. In any case, a reducing agent that is caused to flow via the second passage is subjected to hydrolysis. Even if there is a need to inject a reducing agent not subjected to hydrolysis when next supplying a reducing agent, a reducing agent subjected to hydrolysis can be prevented from being injected by supplying a reducing agent via the first passage at that point.

In addition, the controller can control the pump so that a reducing agent located further toward side of the injection valve than the hydrolysis catalyst flows toward a side of the hydrolysis catalyst during a cold start of the internal combustion engine.

Once warm up of the internal combustion engine is completed, the temperature inside an exhaust passage also rises and a reducing agent not subjected to hydrolysis is injected from the injection valve. Therefore, when the internal combustion engine is stopped after warm up of the internal combustion engine is completed, a reducing agent not subjected to hydrolysis becomes the residual reducing agent. In addition, when the internal combustion engine is subsequently started in a cold state, since the temperature inside the exhaust passage has dropped, a reducing agent subjected to hydrolysis ends up being injected from the injection valve. Therefore, by causing a backflow of a reducing agent toward a side of the hydrolysis catalyst during a cold start of the internal combustion engine, a reducing agent not subjected to hydrolysis can be caused to flow into the hydrolysis catalyst. On the other hand, when a cold start of the internal combustion engine is not performed, there is no need to cause a backflow of a reducing agent. A cold start of an internal combustion engine refers to starting the internal combustion engine in a state where a temperature of cooling water of the internal combustion engine is lower than a temperature after completion of warm up. In addition, "during a cold start of the internal combustion engine" may include immediately before starting the internal combustion engine or immediately after the internal combustion engine is started. Alternatively, "during a cold start of the internal combustion engine" may be from start of an internal combustion engine to completion of warm up of the internal combustion engine.

According to the present invention, when injecting a reducing agent from an injection valve capable of supplying a plurality of types of reducing agents, a reducing agent of a different type to an intended reducing agent can be prevented from being injected.

Further features of the present invention will become apparent from the following description of exemplary embodiments with reference to the attached drawings.

DESCRIPTION OF THE PREFERRED EMBODIMENTS

Hereinafter, modes for implementing the present invention will be described in detail by way of example of embodiments with reference to the drawings. However, it is to be understood that dimensions, materials, shapes, relative arrangements, and the like of components described in the embodiments are not intended to limit the scope of the invention thereto unless otherwise noted.

First Embodiment

Figure 1:
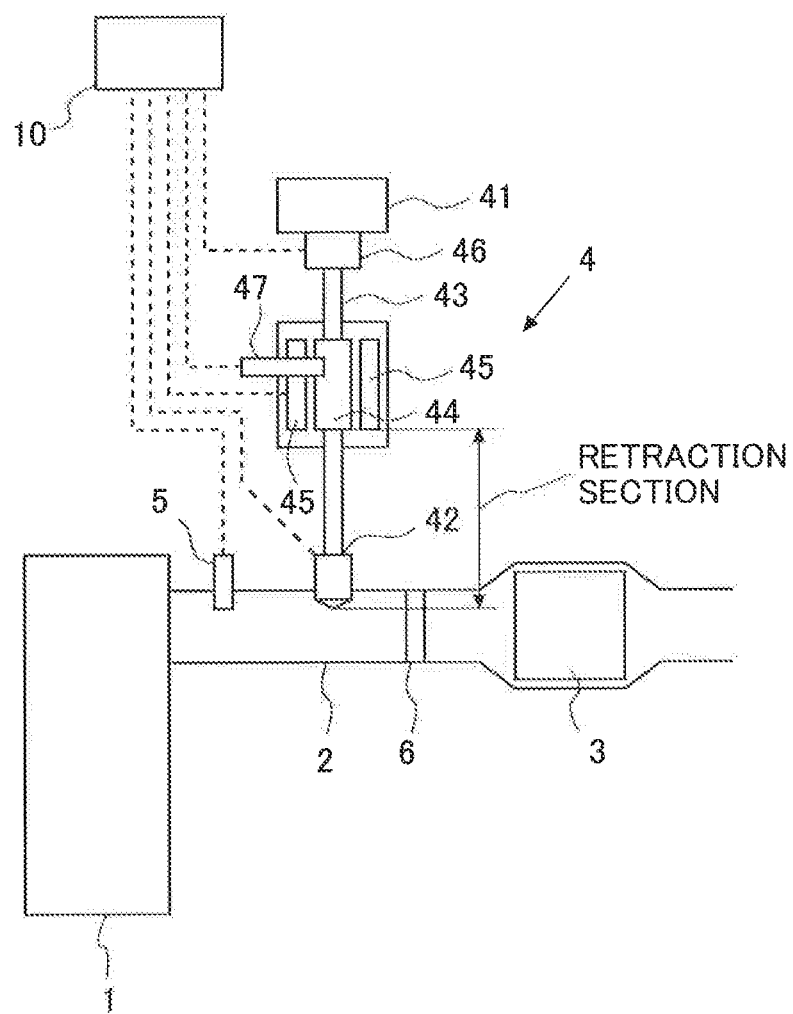
FIG. 1 is a schematic configuration diagram of an exhaust gas purification apparatus of an internal combustion engine according to a first embodiment.

FIG. 1 is a schematic configuration diagram of an exhaust gas purification apparatus of an internal combustion engine according to the present embodiment. An internal combustion engine 1 shown in FIG. 1 is a water-cooled 4-cycle diesel engine having a plurality of cylinders. Moreover, the following embodiment can be similarly applied to a gasoline engine. The internal combustion engine 1 is mounted on, for example, a vehicle.

An exhaust passage 2 is connected to the internal combustion engine 1. A selective catalytic reduction NOx catalyst 3 (SCR catalyst 3) is provided in the exhaust passage 2. The SCR catalyst 3 adsorbs ammonia, and when NOx passes through the SCR catalyst 3, the SCR catalyst 3 selectively reduces NOx using the adsorbed ammonia.

A reducing agent supply apparatus 4 that supplies a reducing agent to the SCR catalyst 3 is provided in the exhaust passage 2 on an upstream side of the SCR catalyst 3. The reducing agent supply apparatus 4 includes a tank 41, an injection valve 42, a reducing agent passage 43, a hydrolysis catalyst 44, a heater 45, a pump 46, and a catalyst temperature sensor 47.

The tank 41 stores a urea aqueous solution as a reducing agent. The injection valve 42 is attached to the exhaust passage 2 on an upstream side of the SCR catalyst 3 and injects a reducing agent. The reducing agent, passage 43 connects the tank 41 and the injection valve 42 with each other to cause a reducing agent to flow through. The hydrolysis catalyst 44 is a catalyst that hydrolyzes urea at or above a prescribed temperature to convert the urea into, for example, ammonium carbamate or ammonium carbonate. Moreover, even when a reducing agent flows through the hydrolysis catalyst 44, a liquid state of the reducing agent is maintained. Therefore, a liquid (aqueous solution) reducing agent is injected from the injection valve 42.

The heater 45 is provided on an outer peripheral surface of the hydrolysis catalyst 44 and generates heat when energized to heat the hydrolysis catalyst 44. When the hydrolysis catalyst 44 is heated by the heater 45, a temperature of the hydrolysis catalyst 44 rises to or above a prescribed temperature at which urea is hydrolyzed. Moreover, as a method of hydrolyzing the urea aqueous solution, for example, a method described, in Japanese Patent Application Laid-open No. 2004-202450 may be used. In other words, in the present embodiment, in order to prevent a reducing agent from being gasified during hydrolysis, pressure inside the reducing agent supply apparatus 4 may be raised to pressure at which gasification of the reducing agent can be prevented. This configuration will be described in a third embodiment.

The pump 46 is provided at a location where the reducing agent passage 43 connects to the tank 41 and discharges a reducing agent. Moreover, the pump 46 discharges a reducing agent from a side of the tank 41 to a side of the injection valve 42 during a forward rotation and discharges the reducing agent from the side of the injection valve 42 to the side of the tank 41 during a reverse rotation. Alternatively, the pump 46 may be installed inside the tank 41. The pump 46 is an electric pump and rotates when power is supplied thereto. Therefore, the pump 46 can be operated even when the internal combustion engine 1 has stepped. In addition, the catalyst temperature sensor 47 that detects a temperature of the hydrolysis catalyst 44 is provided in the hydrolysis catalyst 44. Furthermore, an exhaust temperature sensor 5 that detects a temperature of exhaust gas is provided in the exhaust passage 2 on an upstream side of the injection valve 42. Moreover, a "temperature inside the exhaust passage 2" as described in the present embodiment will refer to a temperature detected by the exhaust, temperature sensor 5 unless otherwise noted. In addition, a mixer 6 that disperses a reducing agent into exhaust gas is provided in the exhaust passage 2 on a downstream side of the injection valve 42 and an upstream side of the SCR catalyst 3. The mixer 6 widely disperses a liquid reducing agent into exhaust gas by causing a collision or the reducing agent. However, the mixer 6 is not necessarily essential.

In the present embodiment, urea, ammonia, and substances obtained by hydrolyzing urea (for example, ammonium carbamate and ammonium carbonate) will be collectively referred to as a reducing agent. An ammonia, precursor (ammonium carbamate or ammonium carbonate obtained by hydrolyzing urea or urea) is injected, from the injection valve 42. The ammonia precursor is hydrolyzed by heat, of exhaust gas or heat from the SCR catalyst 3 and becomes ammonia, and is adsorbed by the SCR catalyst 3.

The internal combustion engine 1 configured as described above is provided with an ECU 10 that is an electronic control unit or electronic controller for controlling the internal combustion engine 1. The ECU 10 controls the internal combustion engine 1 in accordance with, operating conditions of the internal combustion engine 1 or demands by a driver. Moreover, in the embodiment, the ECU 10 corresponds to the controller according to the present invention.

The catalyst, temperature sensor 47 and the exhaust temperature sensor 5 are connected to the ECU 10 via electric wiring to enable output signals of the sensors to be input to the ECU 10. In addition, the ECU 10 estimates a temperature of the SCR catalyst 3 based on an output signal of the exhaust temperature sensor 5. Moreover, a temperature of exhaust gas that is detected by the exhaust temperature sensor 5 may be assumed to be equal to the temperature of the SCR catalyst 3. In addition, the temperature of the SCR catalyst 3 can also be estimated based on an operating state of the internal combustion engine 1. Meanwhile, the injection valve 42, the heater 45, and the pump 46 are connected to the ECU 10 via electric wiring and, accordingly, the injection valve 42, the heater 45, and the pump 46 are controlled by the ECU 10.

In addition, the ECU 10 performs reducing agent injection control that is control for supplying a reducing agent to the SCR catalyst 3 in order to reduce NOx in exhaust gas passing through the SCR catalyst 3. In reducing agent injection control, by operating the pump 46 and, at the same time, opening the injection valve 42 to inject a reducing agent from the injection valve 42, the reducing agent is supplied to the SCR catalyst 3. An injected amount of a reducing agent from the injection valve 42 is determined in accordance with, for example, an amount of NOx flowing into the SCR catalyst 3. An amount of NOx flowing into the SCR catalyst 3 is equal to an amount of NOx discharged from the internal combustion engine 1. Since an amount of NOx discharged from the internal combustion engine 1 has a correlation with an operating state (for example, an engine rotational speed and an engine load) of the internal combustion engine 1, the amount of NOx discharged from the internal combustion engine 1 can be estimated based on an operating state of the internal combustion engine 1. Alternatively, a sensor that detects NOx concentration can be provided in the exhaust passage 2 on an upstream side of the SCR catalyst 3 and an amount of NOx flowing into the SCR catalyst 3 can be estimated based on a detected value of the sensor and an intake air amount. In addition, injection of a reducing agent from the injection valve 42 is performed so that an ammonia adsorption amount at the SCR catalyst 3 is constant. The ammonia adsorption amount is an amount such that, for example, a NOx purification rate of the SCR catalyst 3 falls within an allowable range and, at the same time, ammonia does not flow out from the SCR catalyst 3. Since an amount of reduction of the ammonia adsorption amount at the SCR catalyst 3 can be calculated based on an amount of NOx flowing into the SCR catalyst 3, the reducing agent is injected from the injection valve 42 so as to compensate for the amount of reduction of the ammonia adsorption amount. Moreover, since the ammonia adsorption amount at the SCR catalyst 3 changes according to a temperature of the SCR catalyst 3, a targeted ammonia adsorption amount is varied based on the temperature of the SCR catalyst 3. In addition, a timing at which a reducing agent is injected from the injection valve 42 is not limited to the timing described above and, for example, the reducing agent may be injected from the injection valve 42 at every prescribed travel distance or at every prescribed time.

In reducing agent injection control, an injected amount may be varied in accordance with a type of the reducing agent to be injected.

Figure 2:
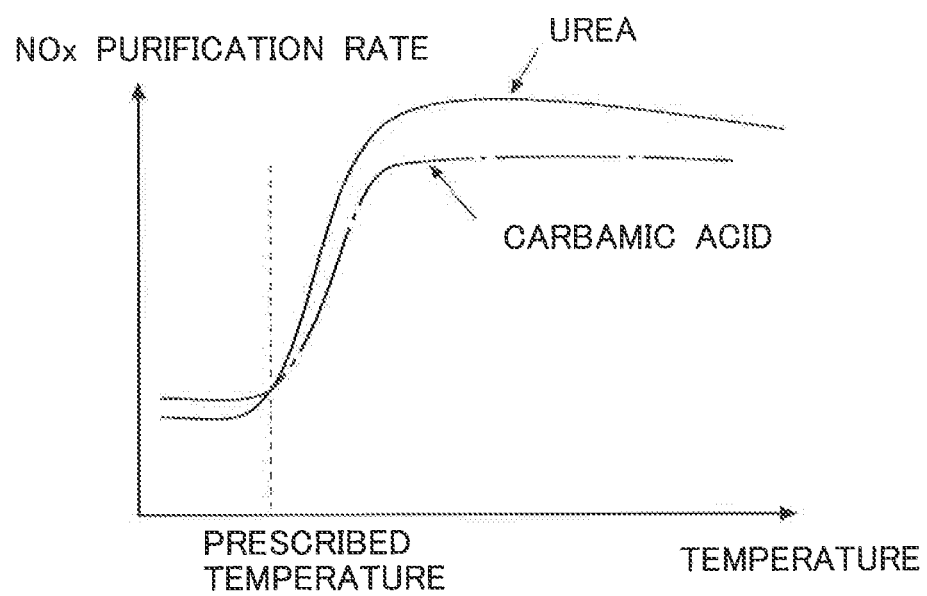
FIG. 2 is a diagram showing a relationship between a temperature inside an exhaust passage and a NOx purification rate of a SCR catalyst.

Furthermore, the ECU 10 controls the heater 45 in accordance with a temperature inside the exhaust passage 2 (or a temperature of the SCR catalyst 3). FIG. 2 is a diagram showing a relationship between the temperature inside the exhaust passage 2 and a NOx purification rate of the SCR catalyst 3. A solid line represents a case where a urea, aqueous solution is injected from the injection valve 42 and a one-dot chain line represents a case where a carbamic acid aqueous solution is injected from the injection, valve 42. The NOx purification rate is a ratio of NOx concentration in exhaust gas which decreases as NOx is reduced, at the SCR catalyst 3 to NOx concentration in exhaust gas flowing into the SCR catalyst 3. Carbamic acid is obtained by hydrolyzing urea.

As shown in FIG. 2, when the temperature inside the exhaust passage 2 is low, a higher NOx purification rate is achieved by supplying carbamic acid as compared to supplying urea. On the other hand, when the temperature inside the exhaust passage 2 rises, NOx purification rates are reversed between a case where urea is supplied and a case where carbamic acid is supplied and, consequently, a higher NOx purification rate is achieved by supplying urea as compared to supplying carbamic acid. In this case, a temperature range in which a higher NOx purification rate is achieved by supplying carbamic acid as compared to supplying urea is a temperature range upon a cold start of the internal combustion engine 1. Therefore, once sufficient time has lapsed from the start of the internal combustion engine 1, the temperature inside the exhaust passage 2 hardly ever falls within this range. In FIG. 2, a lower limit value of temperatures at which the NOx purification rate is higher when using urea as compared to using carbamic acid is represented by a prescribed temperature.

As shown in FIG. 2, in order to increase the NOx purification rate, carbamic acid is preferably injected from the injection valve 42 when the temperature inside the exhaust passage 2 is lower than the prescribed, temperature and urea is preferably injected from the injection valve 42 when, the temperature inside the exhaust, passage 2 is equal to or higher than the prescribed temperature. Moreover, a tendency similar to that of carbamic acid shown in FIG. 2 is demonstrated even when using ammonium carbonate or the like which is obtained by hydrolyzing urea. In this case, since carbamic acid is readily converted to ammonia at a lower temperature than urea, carbamic acid is readily gasified in the exhaust passage 2. In addition, there may be cases where the mixer 6 has a collision diffusing unit that causes gas having collided with the mixer 6 to be diffused into the exhaust passage 2 and a passage that allows gas to flow downstream without being diffused. With this mixer 6, there may be cases where, due to gasification of a reducing agent, an amount of the reducing agent that does not collide with the collision diffusing unit of the mixer 6 increases and, consequently, a degree of mixing of exhaust gas and the reducing agent or diffusion of the reducing agent is insufficient even if the reducing agent passes through the mixer 6. Therefore, when urea can be converted to ammonia at the SCR catalyst 3, there may be cases where a higher NOx purification rate can be achieved by injecting urea from the injection valve 42 as compared to injecting carbamic acid or the like. In this case, after warm up of the internal combustion engine 1 is completed and the temperature inside the exhaust passage 2 rises, urea is converted into ammonia even when urea is injected from the injection valve 42. Furthermore, when injecting urea from the injection valve 42, heating need not be performed by the heater 45. Therefore, when the temperature inside the exhaust passage 2 is high, injecting urea is more preferable than injecting hydrolyzed urea. For this reason, in the present embodiment, urea is injected when the temperature inside the exhaust passage 2 is equal to or higher than the prescribed temperature.

On the other hand, when the temperature inside the exhaust passage 2 is lower than the prescribed temperature, urea is not converted into ammonia even if injected from the injection valve 42 and may change to deposited matter that is deposited on the SCR catalyst 3. As a result, an ammonia adsorption amount at the SCR catalyst 3 decreases and may cause both a decline in the NOx purification rate and deterioration of the SCR catalyst 3 due to the deposited matter. Therefore, when the temperature inside the exhaust passage 2 is lower than the prescribed temperature, a reducing agent that is converted into ammonia at a lower temperature is preferably injected. In other words, injecting ammonium carbamate, ammonium carbonate, or the like obtained by hydrolyzing urea is more preferable than supplying urea. In consideration thereof, in the present embodiment, when the temperature inside the exhaust passage 2 is lower than the prescribed temperature, a reducing agent subjected to hydrolysis is injected from the injection valve 42. Moreover, an injected amount, of a reducing agent can be adjusted more readily when injecting a liquid reducing agent from the injection valve 42 as compared to injecting a gas reducing agent from the injection valve 42. Therefore, in the present embodiment, a liquid reducing agent is injected from the injection valve 42. In other words, urea, ammonium carbamate, ammonium carbonate, or the like is injected in an aqueous solution state.

Figure 3:
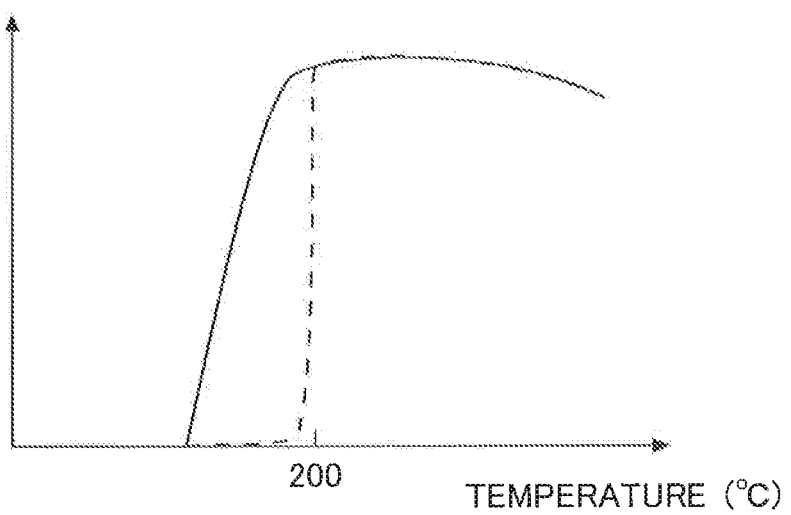
FIG. 3 is a diagram showing a relationship between a temperature inside an exhaust passage and a NOx purification rate of a SCR catalyst.

FIG. 3 is a diagram showing a relationship between the temperature inside the exhaust passage 2 and a NOx purification rate of the SCR catalyst 3. A solid line represents a case where ammonia is supplied to the SCR catalyst 3 and a one-dot chain line represents a case where a urea aqueous solution is supplied to the SCR catalyst 3. The NOx purification rate of the SCR catalyst 3 does not increase unless the SCR catalyst 3 adsorbs ammonia. When a urea aqueous solution is added at a low temperature, the urea aqueous solution changes into a compound such as biuret and becomes deposited matter at the SCR catalyst 3. This prevents ammonia from being adsorbed by the SCR catalyst 3. Since the urea aqueous solution is only supplied at or above a temperature at which urea is converted into ammonia (for example, 180 to 190 degrees C.), NOx is hardly purified until the temperature inside the exhaust passage 2 rises to this temperature. On the other hand, when supplying ammonia. since ammonia can be adsorbed by the SCR catalyst 3, NOx can be purified from a lower temperature. Therefore, supplying a reducing agent that can be converted into ammonia even at a low temperature enables a temperature range in which NOx can be purified to be further expanded.

Therefore, when the temperature inside the exhaust passage 2 is lower than the prescribed temperature, a reducing agent is injected from the injection valve 42 after energizing the heater 45 and hydrolyzing urea. In this case, energization of the heater 45 is controlled so that ammonium carbamate, ammonium carbonate, or the like is injected as a reducing agent in the form of an aqueous solution from the injection valve 42. On the other hand, when the temperature inside the exhaust passage 2 is equal to or higher than the prescribed temperature, energization of the heater 45 is stopped and a reducing agent is injected from the injection valve 42. In this case, a urea aqueous solution is injected as a reducing agent. The prescribed temperature may be set to a lower limit value of temperatures at which a higher NOx purification rate can be achieved by not hydrolyzing urea as compared to hydrolyzing urea. Alternatively, the prescribed temperature may be set to a temperature at which urea can be hydrolyzed to ammonia at the SCR catalyst 3. In addition, energization of the heater 45 may be controlled based on the temperature of the SCR catalyst 3 instead of the temperature inside the exhaust passage 2. Furthermore, when performing hydrolysis of a reducing agent, the reducing agent may be hydrolyzed by energizing the heater 45 while operating the pump 46 to cause the reducing agent to flow through the hydrolysis catalyst 44 or the reducing agent may be hydrolyzed by stopping the pump 46 after temporarily storing the reducing agent in the hydrolysis catalyst 44 and subsequently energizing the heater 45. Moreover, in the embodiment, the heater 45 corresponds to the heater according to the present invention.

When the temperature inside the exhaust passage 2 is equal to or higher than the prescribed temperature, since urea is being injected from the injection valve 42, urea is flowing through the reducing agent passage 43. When the internal combustion engine 1 is stopped and the pump 46 is also stopped in this state, urea is retained inside the reducing agent passage 43. As a result, since the temperature inside the exhaust passage 2 is lower than the prescribed temperature during a next cold start of the internal combustion engine 1, even if the heater 45 is energized, urea remaining in the reducing agent passage 43 located further toward the side of the injection valve 42 than the hydrolysis catalyst 44 and inside the injection valve 42 (in other words, a residual reducing agent) cannot be hydrolyzed. Therefore, even if a reducing agent is injected while energizing the heater 45 during a subsequent cold start of the internal combustion engine 1, urea that is a residual reducing agent is injected first. This urea is not converted info ammonia when the temperature inside the exhaust passage 2 is low. Therefore, during a cold start of the internal combustion engine 1, a reducing agent may be deposited on the SCR catalyst 3 or a NOx purification rate may decline.

In contrast, in the present embodiment, a backflow of a reducing agent is performed when the internal combustion engine 1 is stopped. In this case, the backflow of a reducing agent is performed so that all of the urea remaining in the reducing agent passage 43 located further toward the side of the injection valve 42 than the hydrolysis catalyst 44 and in the injection valve 42 (a "retraction section" shown in FIG. 1) reaches the hydrolysis catalyst 44. In other words, the backflow of a reducing agent is performed so that no reducing agent exists in the retraction section when the internal combustion engine 1 is stopped. The backflow of a reducing agent is performed by reversing a rotational direction or the pump 46. Accordingly, during a cold start of the internal combustion engine 1, by energizing the heater 45, all of a reducing agent injected from the injection valve 42 becomes a reducing agent after hydrolyzing urea. Moreover, even if a backflow of a reducing agent is performed so that a part of a reducing agent remaining in the retraction section reaches the hydrolysis catalyst 44, since the reducing agent having reached the hydrolysis catalyst 44 is hydrolyzed, an injected amount of a reducing agent not subjected to hydrolysis can be reduced.

In the present embodiment, a period in which a backflow of a reducing agent is performed may be obtained in advance by an experiment, a simulation, or the like as a period in which all of a reducing agent existing in a retraction section may reach the hydrolysis catalyst 44. However, alternatively, a pressure sensor or a liquid level sensor may be provided in the reducing agent passage 43 located further toward the side of the injection valve 42 than the hydrolysis catalyst 44, in which case the sensor may detect whether or not a reducing agent exists and a period until the reducing agent no longer exists may be adopted as a period in which a backflow of a reducing agent is performed. In addition, a backflow of a reducing agent is performed while the internal combustion engine 1 is stopped in preparation of a next cold start. In other words, when the internal combustion engine 1 is in operation, since the temperature inside the exhaust passage 2 is high, urea is injected from the injection valve 42 in most cases. However, when the internal combustion engine 1 is stopped, the temperature inside the exhaust passage 2 drops and hydrolyzed urea is to be injected at a next start of the internal combustion engine 1. Therefore, a backflow or a reducing agent is performed when the internal combustion engine 1 is stopped. Moreover, a backflow of a reducing agent need, only be performed before the pump 46 is operated in order to initially inject the reducing agent during a cold start of the internal combustion engine 1. In other words, a backflow of a reducing agent may be performed in any of a period, after a driver performs an operation for stopping the internal combustion engine 1 and before the internal combustion engine 1 stops, a period after the internal combustion engine 1 stops and before the internal combustion engine 1 starts, or after the internal combustion engine 1 starts. In any case, a backflow of a reducing agent to the hydrolysis catalyst 44 need only be performed after injection of a reducing agent not subjected to hydrolysis is completed and before injection of a reducing agent subjected to hydrolysis is started. Moreover, in order to switch a reducing agent to be injected from a reducing agent not subjected to hydrolysis to a reducing agent subjected, to hydrolysis when the temperature inside the exhaust passage 2 drops from a temperature that is equal so or higher than the prescribed temperature to below the prescribed temperature during an operation of the internal combustion engine 1, by performing a backflow of the reducing agent during the operation of the internal combustion engine 1, a reducing agent not subjected to hydrolysis can be prevented from being injected during the switching.

Furthermore, when performing hydrolysis, the reducing agent may be hydrolyzed by energizing the heater 45 while causing a reverse rotation of the pump 46 to cause the reducing agent to pass through the hydrolysis catalyst 44 or the reducing agent may be hydrolyzed by stopping the pump 46 softer temporarily storing the reducing agent in the hydrolysis catalyst 44 and subsequently energizing the heater 45.

Figure 4:
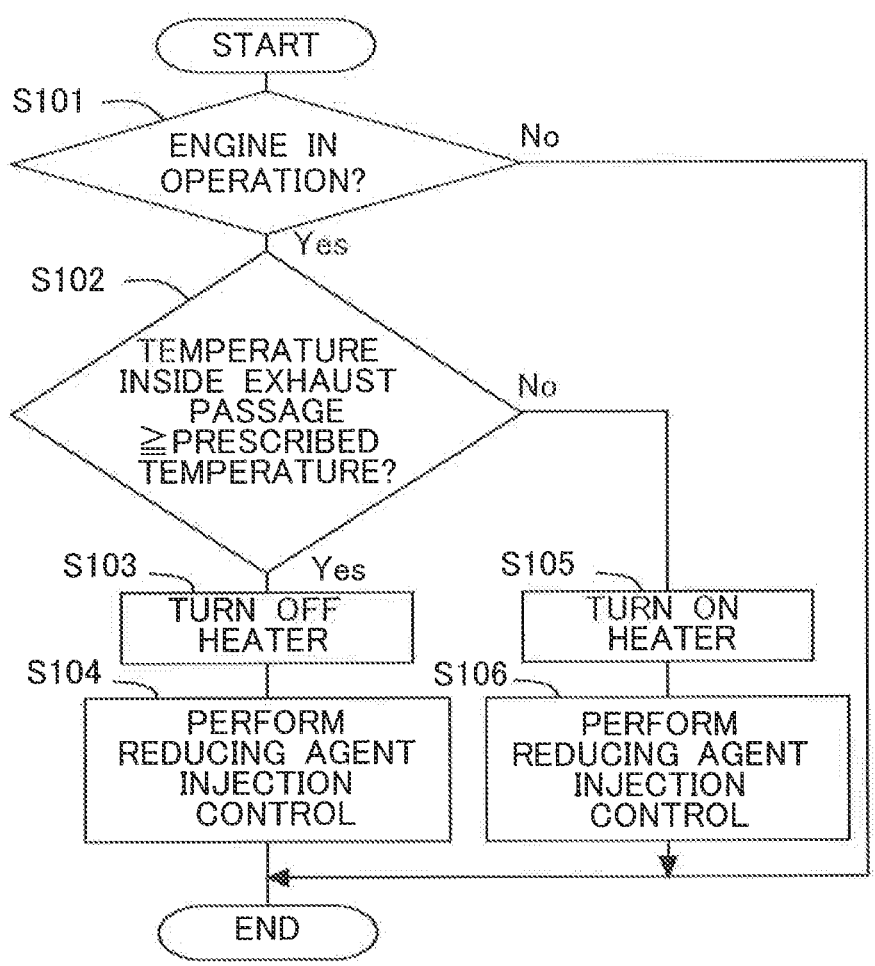
FIG. 4 is flow chart showing a control flow of a reducing agent supply apparatus according to the first embodiment.

FIG. 4 is a flow chart showing a control flow of the reducing agent supply apparatus 4 according to the present embodiment. The present flow chart is performed every prescribed time by the ECU 10.

In step S101, a determination is made on whether or not the internal combustion engine 1 is in operation. For example, a determination is made that the internal combustion engine 1 is in operation when a rotation speed of the internal combustion engine 1 is greater than 0. When a positive determination is made in step S101, the present flow chart advances to step S102, and when a negative determination is made, the present flow chart is ended. Alternatively, when a negative determination is made in step S101, the present flow chart may proceed to step S202 to be described later.

In step S102, a determination is made on whether or not a temperature inside the exhaust passage 2 is equal to or higher than the prescribed temperature. The prescribed temperature is a lower limit value of temperatures at which a higher NOx purification rate is achieved by supplying urea as compared to supplying a substance obtained by hydrolyzing urea such as ammonium, carbamate and ammonium carbonate. More specifically, the prescribed temperature is a lower limit value of temperatures at which a higher NOx purification rate is achieved by not hydrolyzing urea as compared to hydrolyzing urea or, in other words, a lower limit value of temperatures at which a higher NOx purification rate is achieved by not energizing the heater 45 as compared to energizing the heater 45. Therefore, this means that, in present step S102, a determination is made on whether or not a state exists where hydrolysis of urea is unnecessary.

When a positive determination is made in step S102, the present flow chart advances to step S103 to stop energization of the heater 45. Moreover, if a state exists where the heater 45 is not energized before step S103 is processed, the state is maintained. Once the process of step S103 is completed, the present flow chart proceeds to step S104. On the other hand, when a negative determination is made in step S102, the present flow chart advances to step S105 to energize the heater 45. When energizing the heater 45, feedback control of power supplied to the heater 45 may be performed so that a temperature detected by the catalyst temperature sensor 47 equals a temperature at which urea is hydrolyzed (hydrolysis temperature). Moreover, if a state exists where the heater 45 is energized before step S105 is processed, the state is maintained. In addition, even when a negative determination is made in step S102, the heater 45 need not always be energized. The heater 45 may be energized in accordance with an injection of a reducing agent from the injection valve 42 or an operation of the pump 46, Moreover, when performing hydrolysis while causing a reducing agent to flow into the hydrolysis catalyst 44, a capacity of the hydrolysis catalyst 44 or a flow rate of the reducing agent may be set so that hydrolysis of the reducing agent is completed after the reducing agent flows into the hydrolysis catalyst 44 and before the reducing agent flows out from the hydrolysis catalyst 44. Once the process of step S105 is completed, the present flow chart proceeds to step S106.

In steps S104 and S106, reducing agent injection control is performed. In other words, a reducing agent is injected from the injection valve 42 as appropriate. In addition, when injecting a reducing agent from the injection valve 42, the pump 46 is operated. Since an amount of reduction of an ammonia adsorption amount at the SCR catalyst 3 can be calculated based en an amount of NOx having flowed into the SCR catalyst 3 within in a period from performance of a previous flow chart to performance of a current flow chart, the reducing agent is injected from the injection valve 42 so as to compensate for the amount of reduction of the ammonia adsorption amount. Moreover, since the ammonia adsorption amount at the SCR catalyst 3 changes according to a temperature of the SCR catalyst 3, a targeted ammonia adsorption amount is varied based on the temperature of the SCR catalyst 3. Since the temperature of the SCR catalyst 3 in step S104 is higher than the temperature of the SCR catalyst 3 in step S106, a larger amount of ammonia can be adsorbed. Therefore, an ammonia adsorption amount that is targeted in step S104 is larger than an ammonia adsorption amount that is targeted in step S106. In addition, urea is injected as a reducing agent in step S104 while ammonium carbamate or the like is injected as a reducing agent in step S106. An injected amount of a reducing agent may be adjusted as appropriate in accordance with a difference in the types of reducing agents. Once the process of step S104 or S106 is completed, the present flow chart is ended.

Moreover, in the flow chart shown in FIG. 4, hydrolysis of a reducing agent is performed while causing the reducing agent to flow through the hydrolysis catalyst 44. In the present embodiment, instead of performing hydrolysis of a reducing agent while causing the reducing agent to flow through the hydrolysis catalyst 44, hydrolysis of a reducing agent may be performed after temporarily storing the reducing agent in the hydrolysis catalyst 44. In this case, when temporarily storing the reducing agent in the hydrolysis catalyst 44, after hydrolysis of a reducing agent that is stored in the hydrolysis catalyst 44 is completed, the pump 46 is operated and the injection valve 42 is opened in accordance with a supply timing of the reducing agent to cause the reducing agent to flow from the hydrolysis catalyst 44 to the side of the injection valve 42. In addition, the pump 46 is stopped and the heater 45 is energized upon the end of injection of the reducing agent to hydrolyze a reducing agent having newly flowed into the hydrolysis catalyst 44. When energizing the heater 45, feedback control based on a temperature detected by the catalyst temperature sensor 47 may be performed so that a temperature of the hydrolysis catalyst 44 equals a temperature required for hydrolysis of a reducing agent. In addition, a period of energization of the heater 45 may be obtained in advance by an experiment, a simulation, or the like as a period until hydrolysis of a reducing agent is completed.

Figure 5:
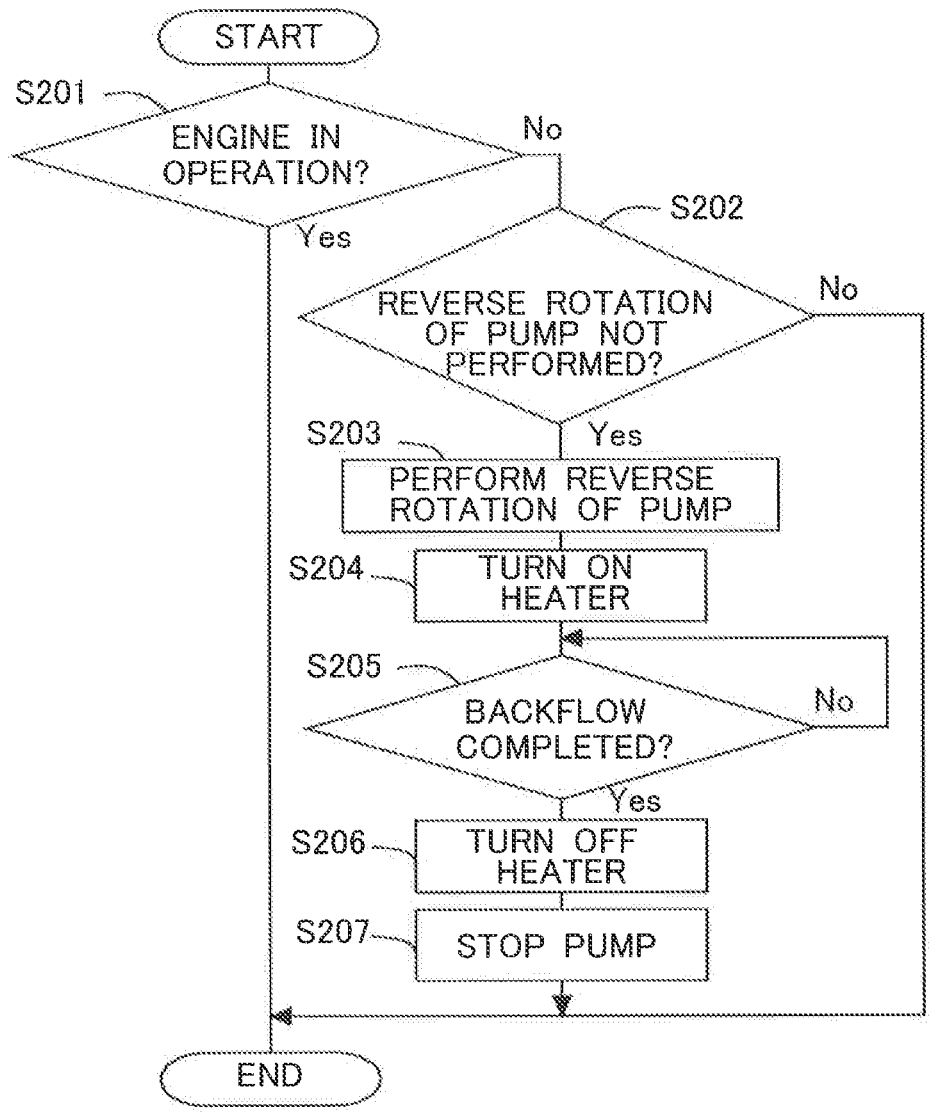
FIG. 5 is a flow chart showing a control flow when causing a backflow of a residual reducing agent to a hydrolysis catalyst according to the first embodiment.

Next, a control flow when causing a backflow of a residual reducing agent to the hydrolysis catalyst 44 for the purpose of retraction will be described. FIG. 5 is a flow chart showing a control flow when causing a backflow of a residual reducing agent to the hydrolysis catalyst 44 according to the present embodiment. The present flow chart is performed every prescribed time by the ECU 10.

In step S201, a determination is made on whether or not the internal combustion engine 1 is in operation. For example, a determination is made that the internal combustion engine 1 is in operation when a rotation speed of the internal combustion engine 1 is greater than 0. When a positive determination is made in step S201, the present flow chart is ended, and when a negative determination is made, the present flow chart advances to step S202. Alternatively, when a positive determination is made in step S201, the present flow chart may proceed to step S102 shown in FIG. 4.

In step S202, a determination is made on whether or not a reverse rotation of the pump 46 has not been performed alter the internal combustion engine 1 had stopped. In other words, a determination is made on whether or not a backflow of a residual reducing agent has not been performed. Present step S202 is a process for preventing a reverse rotation of the pump 46 from being performed a plurality of times. When a positive determination is made in step S202, the present flow chart advances to step S203, and when a negative determination is made in step S202, the present flow chart is ended.

In step S203, a reverse rotation of the pump 46 is performed. In this case, the injection valve 42 is opened to cause gas inside the exhaust passage 2 to be sucked into the inject ion valve 42 and the reducing agent passage 43. Due to the reverse rotation of the pump 46, a reducing agent flows backward in the injection valve 42 and the reducing agent passage 43. Moreover, if an operation time of the internal combustion engine 1 is sufficiently long, since urea not subjected to hydrolysis is supplied from the injection valve 42, a reducing agent that flows backward is urea. Once the process of step S203 is completed, the present flow chart proceeds to step S204.

In step S204, the heater 45 is energized. In the present step, while causing a backflow of a reducing agent to the hydrolysis catalyst 44, the hydrolysis catalyst 44 is heated to facilitate hydrolysis while causing the reducing agent to flow. In other words, when urea flows backward, ammonium carbamate, ammonium carbonate, or the like is generated at the hydrolysis catalyst 44. Moreover, steps S203 and S204 may be performed in reverse order or may be performed simultaneously. Once the process of step S204 is completed, the present flow chart proceeds to step S205.

In step S205, a determination is made on whether or not the backflow of a reducing agent has been completed. Completion of the backflow of a reducing agent means that there is a state where a reducing agent does not exist in a retraction section. For example, a period until a residual reducing agent existing in a retraction section flows backward further toward a side of the tank 41 than the retraction section may be obtained in advance by an experiment, a simulation, or the like, whereby a determination that the backflow of a reducing agent has been completed may be made when the period has lapsed. Alternatively, a pressure sensor or a liquid level sensor capable of detecting whether or not a reducing agent exists may be provided in the reducing agent passage 43 in the retraction section, in which case a determination that a backflow of a reducing agent has been completed may be made based on a detected value of the sensor. Moreover, while a backflow of all of the residual reducing agent to the hydrolysis catalyst 44 is caused in present step S205, a backflow of a part of the residual reducing agent to the hydrolysis catalyst 44 may be caused instead. Even by hydrolyzing a part of the residual reducing agent in this manner, an amount of a reducing agent not subjected to hydrolysis which is injected from the injection valve 42 can be reduced. When a positive determination is made in step S205, the present flow chart advances to step S206, and when a negative determination is made, step S205 is executed once again.

In step S206, energization of the heater 45 is stopped and, subsequently, in step S207, the pump 46 is stopped. In other words, hydrolysis of a reducing agent and a backflow of the reducing agent are stopped. When stopping the pump 46, the injection valve 42 is closed. Moreover, steps S206 and S207 may be performed in reverse order or may be performed simultaneously. Once the process of step S207 is ended, the present flow chart ends.

Moreover, in the flow chart described above, the heater 45 is simultaneously energized when a reverse rotation of the pump 46 is performed to cause a backflow of the residual reducing agent to the hydrolysis catalyst 44. On the other hand, the heater 45 may not be energized when a reverse rotation of the pump 46 is performed and, instead, the pump 46 may be stopped after temporarily storing the residual reducing agent in the hydrolysis catalyst 44 and the heater 45 may be subsequently energized. The backflow of a reducing agent by the pump 46 and subsequent energization of the heater 45 are to be performed before a reducing agent is initially injected after the internal combustion engine 1 is started.

Figure 6:
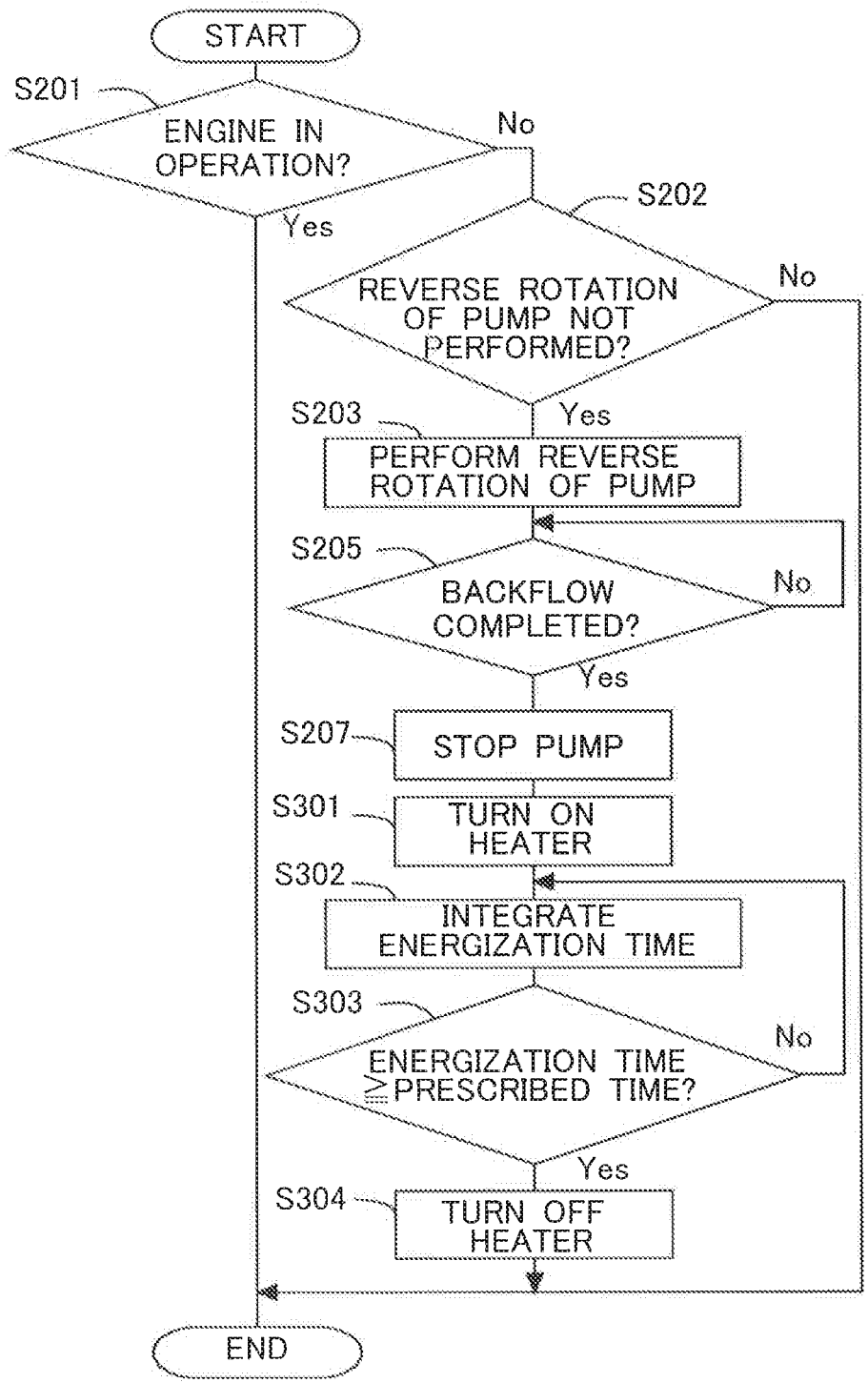
FIG. 6 is a flow chart showing a control flow when energizing a heater after temporarily storing a residual reducing agent in a hydrolysis catalyst according to one first embodiment.

FIG. 6 is a flow chart showing a control flow when energizing the heater 45 after temporarily storing a residual reducing agent in the hydrolysis catalyst 44 according to the present embodiment. The present flow chart is executed in place of the flow shown in FIG. 5. Moreover, steps in which same processes as those in the flow chart described earlier are performed will be denoted by same reference characters and a description thereof will be omitted. The present flow chart assumes a case where all of a residual reducing agent can be stored in the hydrolysis catalyst 44 by causing a backflow of the residual reducing agent only once.

In the flow chart shown in FIG. 6, the heater 45 is not energized until the pump 46 is stopped in step S207. In other words, after the pump 46 is stopped in step S207, the present flow chart advances to step S301 to energize the heater 45. In other words, the hydrolysis catalyst 44 is heated. As a result, hydrolysis of a reducing agent stored in the hydrolysis catalyst 44 is facilitated. Once the process of step S301 is completed, the present flow chart proceeds to step S302.

In step S302, time of energization of the heater 45 is integrated. At this point, in the present flow chart, the hydrolysis catalyst 44 is heated by the heater 45 only for a time required to hydrolyze a reducing agent. Therefore, the time of energization of the heater 45 is integrated. Once the process of step S302 is completed, the present flow chart proceeds to step S303.

In step S303, a determination is made on whether or not the time of energization of the heater 45 has equaled or exceeded a prescribed time. The prescribed time in this case refers to a time from the start of energization of the heater 45 to hydrolysis of urea flowing into the hydrolysis catalyst 44 to ammonium carbamate or the like, and is obtained in advance by an experiment, a simulation, or the like. In other words, in present step S303, a determination is made on whether or not hydrolysis of urea has been completed. When a positive determination is made in step S303, the present flow chart advances to step S304, and when a negative determination is made, the present flow chart returns to step S302. In step S304, energization of the heater 45 is stopped and, subsequently, the present flow chart is ended.

Moreover, in the flow chart shown in FIG. 5 or 6, a reverse rotation of the pump 46 in order to cause the residual reducing agent to flow to the hydrolysis catalyst 44 may be performed before the internal combustion engine 1 is stopped, after the internal combustion engine 1 is stopped, or after the internal combustion engine 1 is started. A reverse rotation of the pump 46 may be performed at least before a reducing agent is initially injected after the internal combustion engine 1 is started. For example, a backflow of a residual reducing agent may be performed if a state exists where it is assumed that a reducing agent subjected to hydrolysis will not be injected after the present point in time. In this case, even before the internal combustion engine 1 is stopped, a backflow or a residual reducing agent may be performed when conditions for stopping the internal combustion engine 1 are satisfied. For example, when a driver turns off a key switch, a determination can be made that conditions for stopping the internal combustion engine 1 are satisfied. In such a case, since injection of a reducing agent is also stopped, a backflow of a residual reducing agent may be performed.

Moreover, in the flow chart shown in FIGS. 5 or 6, while the heater 45 is energized to perform hydrolysis of a residual reducing agent in step S204 or S301, instead, only a backflow of the residual reducing agent may be performed without energizing the heater 45. In this case, the heater 45 may be energized to perform hydrolysis of the residual reducing agent before a reducing agent is initially injected after the internal combustion engine 1 is started. Even in this case, if the temperature inside the exhaust passage 2 is lower than the prescribed temperature when the internal combustion engine 1 is next started, the heater 45 is energized in step S105 to perform hydrolysis. Therefore, as along as a backflow of the residual reducing agent is performed, hydrolysis can be performed before injecting a reducing agent. However, there may be cases where it is difficult to immediately inject a reducing agent because of a need to stand by until hydrolysis is completed when the internal combustion engine 1 is started. On the other hand, by hydrolyzing a reducing agent in advance in step S204 or S301, a reducing agent can be promptly injected after the internal combustion engine 1 is started.

In addition, when the internal combustion engine 1 is immediately restarted after being stopped and the temperature inside the exhaust passage 2 is equal to or higher than the prescribed temperature, since it is desirable to supply a reducing agent not subjected to hydrolysis to the SCR catalyst 3, a reducing agent need not be hydrolyzed at the hydrolysis catalyst 44. In such a case, preferably, hydrolysis of a residual reducing agent is not performed. In other words, if the temperature inside the exhaust passage 2 is equal to or higher than the prescribed temperature when the internal combustion engine 1 is started, since it is desirable to inject a reducing agent not subjected to hydrolysis, a determination on whether or not to hydrolyze a residual reducing agent may be made in accordance with the temperature inside the exhaust passage 2 when injecting a reducing agent. In a similar manner, when the internal combustion engine 1 is immediately restarted after being stopped and the temperature inside the exhaust passage 2 is equal to or higher than the prescribed temperature, there is no need to cause a backflow of a residual reducing agent. Therefore, instead of causing a backflow of a residual reducing agent immediately after the internal combustion engine 1 is stopped, a backflow of the residual reducing agent may be performed only when the temperature inside the exhaust passage 2 is lower than the prescribed temperature when injecting a reducing agent.

As described above, according to the present embodiment, since a determination on whether or not to hydrolyze a reducing agent is made in accordance with a temperature inside the exhaust passage 2 when the internal combustion engine 1 is in operation, an appropriate reducing agent can be supplied in accordance with the temperature inside the exhaust passage 2. In addition, when the internal combustion engine 1 is stopped, by causing a backflow of a residual reducing agent to the hydrolysis catalyst 44 to hydrolyze the residual reducing agent, a residual reducing agent not subjected to hydrolysis can be prevented from being injected from the injection valve 42 when the internal combustion engine 1 is next started. In other words, when injecting a reducing agent, from the injection valve 42, a reducing agent of a different type to a required reducing agent can be prevented from being injected.

Second Embodiment

The present embodiment differs from the first embodiment with respect to a configuration of the reducing agent passage 43 and to a control flow. In the present embodiment, differences from the first embodiment will be mainly described.

Figure 7:
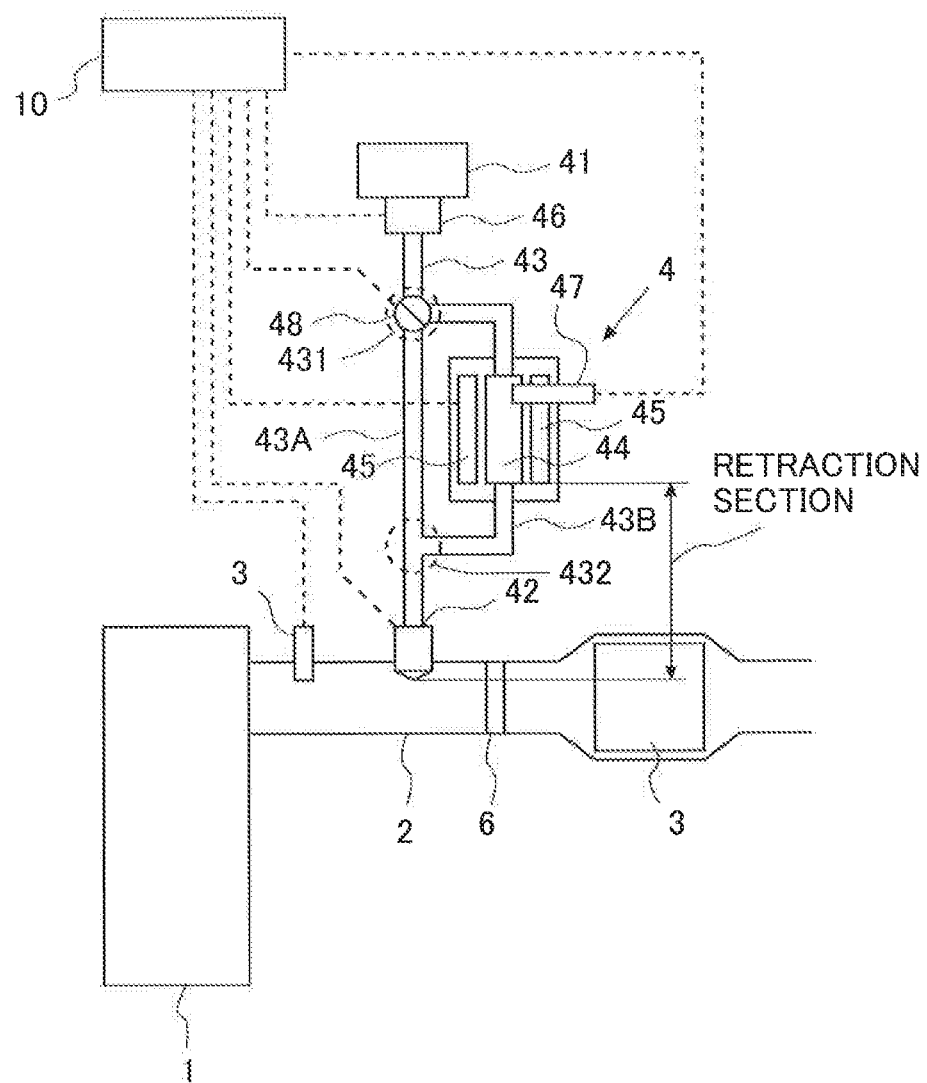
FIG. 7 is a schematic configuration diagram of an exhaust gas purification apparatus of an internal combustion engine according to a second embodiment.

FIG. 7 is a schematic configuration diagram of an exhaust gas purification apparatus of an internal combustion engine according to the present embodiment. The present embodiment is provided with a branching part 431 at which the reducing agent passage 43 branches midway into two passages and a joining part 432 at which the reducing agent passage 43 having branched at the branching part 431 joins together at a location further toward a side of the injection valve 42 than the branching part 431. Moreover, one of the passages of the reducing agent passage 43 from the branching part 431 to the joining part 432 will be referred to as a first passage 43A and the other passage will be referred to as a second passage 43B. The hydrolysis catalyst 44 and the heater 45 that heats the hydrolysis catalyst 44 are provided in the second passage 43B. In addition, a switching valve 48 that switches a flow path of a reducing agent between the first passage 43A and the second passage 43B is provided at the branching part 431. The switching valve 48 is electrically connected to the ECU 10 and is controlled by the ECU 10.

In addition, in the present embodiment, when a temperature inside the exhaust passage 2 is equal to or higher than the prescribed temperature, the switching valve 48 is switched so that a reducing agent flows through the first passage 43A. In other words, the switching valve 48 communicates the reducing agent passage 43 located further toward a side of the tank 41 than the branching part 431 and the first passage 43A with each other. On the other hand, when a temperature inside the exhaust passage 2 is lower than the prescribed, temperature, the switching valve 48 is switched so that a reducing agent flows through the second passage 43B. In other words, the switching valve 48 communicates the reducing agent passage 43 located further toward the side of the tank 41 than the branching part 431 and the second passage 43B with each other.

In this manner, a reducing agent is supplied via the first passage 43A when the temperature inside the exhaust passage 2 is equal to or higher than the prescribed temperature and the reducing agent is supplied via the second passage 43B when the temperature inside the exhaust passage 2 is lower than the prescribed temperature. In addition, when the temperature inside the exhaust passage 2 is lower than the prescribed temperature, a reducing agent is hydrolyzed by energizing the heater 45. As a result, when the temperature inside the exhaust passage 2 is lower than the prescribed temperature, a reducing agent subjected to hydrolysis is injected from the injection valve 42.

Furthermore, in the present embodiment, when the internal combustion engine 1 is stopped, the switching valve 48 is switched so that a reducing agent flows through the second passage 43B and, at the same time, a reverse rotation of the pump 46 is performed, when performing a reverse rotation of the pump 46, the injection valve 42 is opened to take gas inside the exhaust passage 2 into the reducing agent passage 43. In this manner, a reducing agent remaining in the second passage 43B located further toward a side of the joining part 432 than the hydrolysis catalyst 44, the reducing agent passage 43 located further toward a side of the injection valve 42 than the joining part 432, and the injection valve 42 is caused to flow backward to the hydrolysis catalyst 44. At this point, when an operation time of the internal combustion engine 1 is sufficiently long, since the temperature inside the exhaust passage 2 becomes equal to or higher than the prescribed temperature, a reducing agent not subjected to hydrolysis is injected from the injection valve 42. In other words, urea flows via the first passage 43A. When the internal combustion engine 1 is stopped and supply of a reducing agent is stopped in this state, a reducing agent, not subjected to hydrolysis remains in the reducing agent passage 43 located further toward the side of the injection valve 42 than the joining part 432 and in the injection valve 42. Even if the heater 45 is energized upon a next cold start of the internal combustion engine 1 in this state, the reducing agent remaining in the reducing agent passage 43 located further toward the side of the injection valve 42 than the joining part 432 and in the injection valve 42 cannot be hydrolyzed. Therefore, even when a reducing agent is injected while energizing the heater 45, there is a possibility that a reducing agent not subjected to hydrolysis may be initially injected.

In consideration thereof, in the present embodiment, when the internal combustion engine 1 is stopped, the switching valve 48 is switched so that a reducing agent flows through the second passage 43B and, at the same time, a reverse rotation of she pump 46 is performed and the injection valve 42 is opened. As a result, reducing agents respectively remaining in the second passage 43B located further toward the side of the joining part 432 than the hydrolysis catalyst 44, the reducing agent passage 43 located further toward the side of the injection valve 42 than the joining part 432, and the injection valve 42 flow toward the hydrolysis catalyst 44. Moreover, a retraction section according to the present embodiment is constituted by the second passage 43B located further toward the side of the joining part 432 than the hydrolysis catalyst 44. the reducing agent passage 43 located further toward the side of the injection valve 42 than the joining part 432, and the injection valve 42. By causing a backflow of a reducing agent in this manner, urea is prevented from remaining at a location further toward the side of the injection valve 42 than the hydrolysis catalyst 44. When causing a backflow of a reducing agent, a reverse rotation of the pump 46 is performed until at least a part of a reducing agent located further toward the side of the injection, valve 42 than the joining part 432 flows into the hydrolysis catalyst 44. Alternatively, a reverse rotation of the pump 46 may be performed until ail of the reducing agent located further toward the side of the injection valve 42 than the joining part 432 flows into the hydrolysis catalyst 44. Control of the pump 46 and the heater 45 can be considered in a similar manner to the first embodiment.

Figure 8:
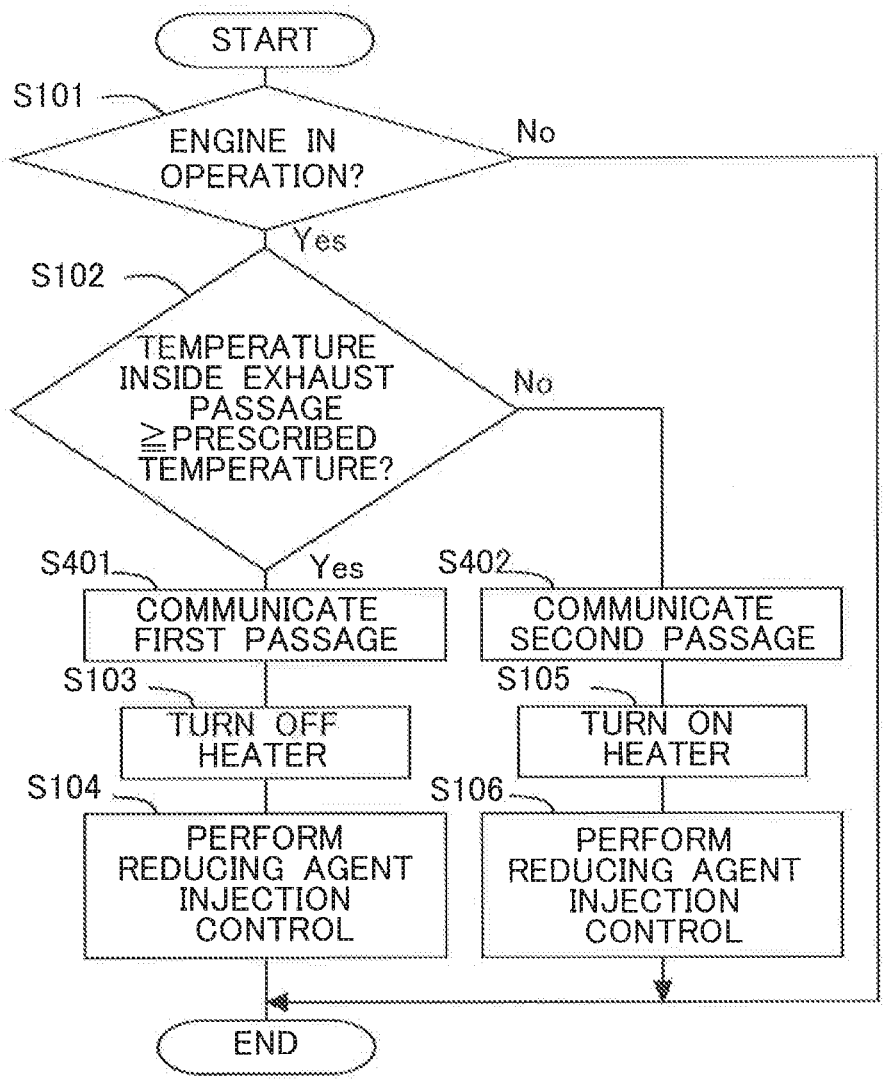
FIG. 8 is a flow chart showing a control flow of a reducing agent supply apparatus according to the second embodiment.

FIG. 8 is a flow chart showing a control flow of the reducing agent supply apparatus 4 according to the present embodiment. The present flow chart is performed every prescribed time by the ECU 10. Steps in which same processes as those in the flow charts described earlier are performed will be denoted by same reference characters and a description thereof will be omitted.

In the flow chart shown in FIG. 8, when a positive determination is made in step S102, the present flow chart proceeds to step S401. In step S401, the switching valve 48 is operated to communicate the reducing agent passage 43 located, further toward the side of the tank 41 than the branching part 431 and the first passage 43A with each other. In other words, the switching valve 48 is operated so that a reducing agent does not pass through the hydrolysis catalyst 44. Once the process of step S401 is completed, the present flow chart proceeds to step S103.

On the other hand, when a negative determination is made in step S102, the present flow chart proceeds to step S402. In step S402, the switching valve 48 is operated to communicate the reducing agent passage 43 located further toward the side of the tank 41 than the branching part 431 and the second passage 43B with each other. In other words, the switching valve 48 is operated so that a reducing agent can flow through the hydrolysis catalyst 44. Once the process of step S402 is completed, the present flow chart proceeds to step S104.

In this manner, by injecting a reducing agent from the injection valve 42 while operating the switching valve 48 in accordance with the temperature inside the exhaust passage 2 when the internal combustion engine 1 is in operation, an appropriate reducing agent can be injected from the injection valve 42 in accordance with the temperature inside the exhaust passage 2.

Moreover, in the flow chart shown in FIG. 8, hydrolysis of a reducing agent is performed while causing the reducing agent to flow through the hydrolysis catalyst 44. In the present embodiment, instead of performing hydrolysis of a reducing agent while causing the reducing agent to flow through the hydrolysis catalyst 44, hydrolysis of a reducing agent may be performed after temporarily storing the reducing agent in the hydrolysis catalyst 44 in a similar manner to the embodiment described above.

Figure 9:
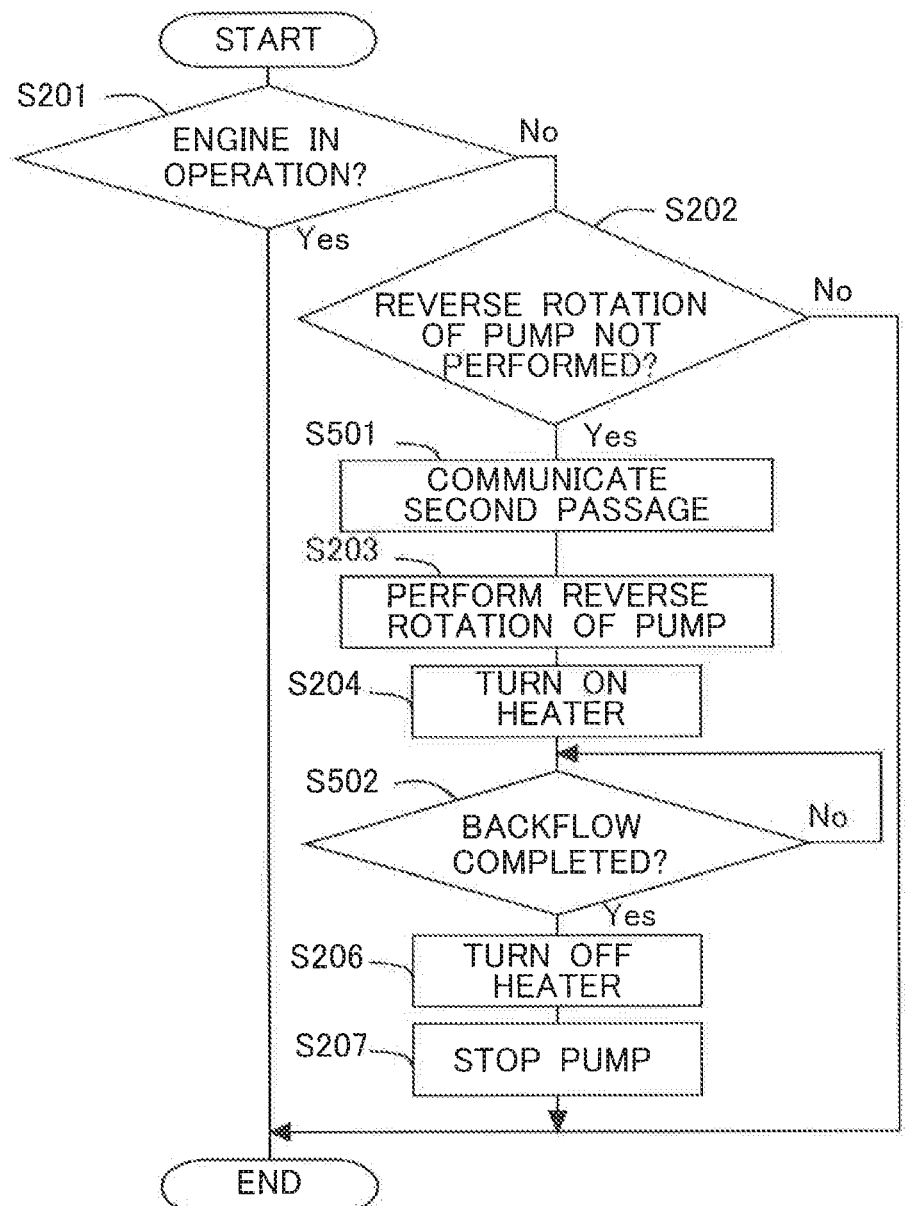
FIG. 9 is a flow chart showing a control flow when causing a backflow of a residual reducing agent to a hydrolysis catalyst according to the second embodiment.

Next, a control flow when causing a backflow of a residual reducing agent to the hydrolysis catalyst 44 will be described. FIG. 9 is a flow chart showing a control flow when causing a backflow of a residual reducing agent to the hydrolysis catalyst 44 according to the present embodiment. The present flow chart is performed every prescribed time by the ECU 10. Moreover, steps in which same processes as those in the flow charts described earlier are performed will be denoted by same reference characters and a description thereof will be omitted.

In the flow chart shown in FIG. 3, when a positive determination is made in step S202, the present flow chart proceeds to step S501, In step S501, the switching valve 48 is operated to communicate the reducing agent passage 43 located further toward the side of the tank 41 than the branching part 431 and the second passage 43B with each other. In other words, the switching valve 48 is operated so that a reducing agent can flow through the hydrolysis catalyst 44. Once the process of step S501 is completed, the present flow chart proceeds to step S203.

In addition, once the process of step S204 is completed, the present flow chart proceeds to step S502. In step S502, a determination is made on whether or not a backflow of a reducing agent has been completed. In the present embodiment, a determination that a backflow, up to the hydrolysis catalyst 44, of a reducing agent has been completed is made when a backflow of at least a part of or all of a reducing agent remaining at a location further toward the side of the injection valve 42 than the joining part 432 occurs. In other words, after causing a backflow of ail of a reducing agent existing in the second passage 43B between the hydrolysis catalyst 44 and the joining part 432 to the hydrolysis catalyst 44, a further backflow of the reducing agent must be performed. For example, a period required until a reducing agent existing in a retraction section located further toward the side of the injection valve 42 than the joining part 432 flows backward further toward a side of the tank 41 than the retraction section may be obtained in advance by an experiment, a simulation, or the like, whereby a determination that the backflow of a reducing agent has been completed may be made when the period has lapsed, When a positive determination is made in step S502, the present flow chart advances to step S206, and when a negative determination is made, step S502 is executed once again.

Moreover, in the flow chart shown in FIG. 9, the heater 45 is simultaneously energized, when a reverse rotation of the pump 46 is performed to cause a backflow of the residual reducing agent to the hydrolysis catalyst 44. On the other hand, the heater 45 may not be energized when a reverse rotation of the pump 46 is performed and, instead, the pump 46 may be stopped after temporarily storing the residual reducing agent in the hydrolysis catalyst 44 and the heater 45 may be subsequently energized. The backflow of a reducing agent by the pump 46 and subsequent energization of the heater 45 are to be performed before a reducing agent is initially injected after the internal combustion engine 1 is started.

Figure 10:
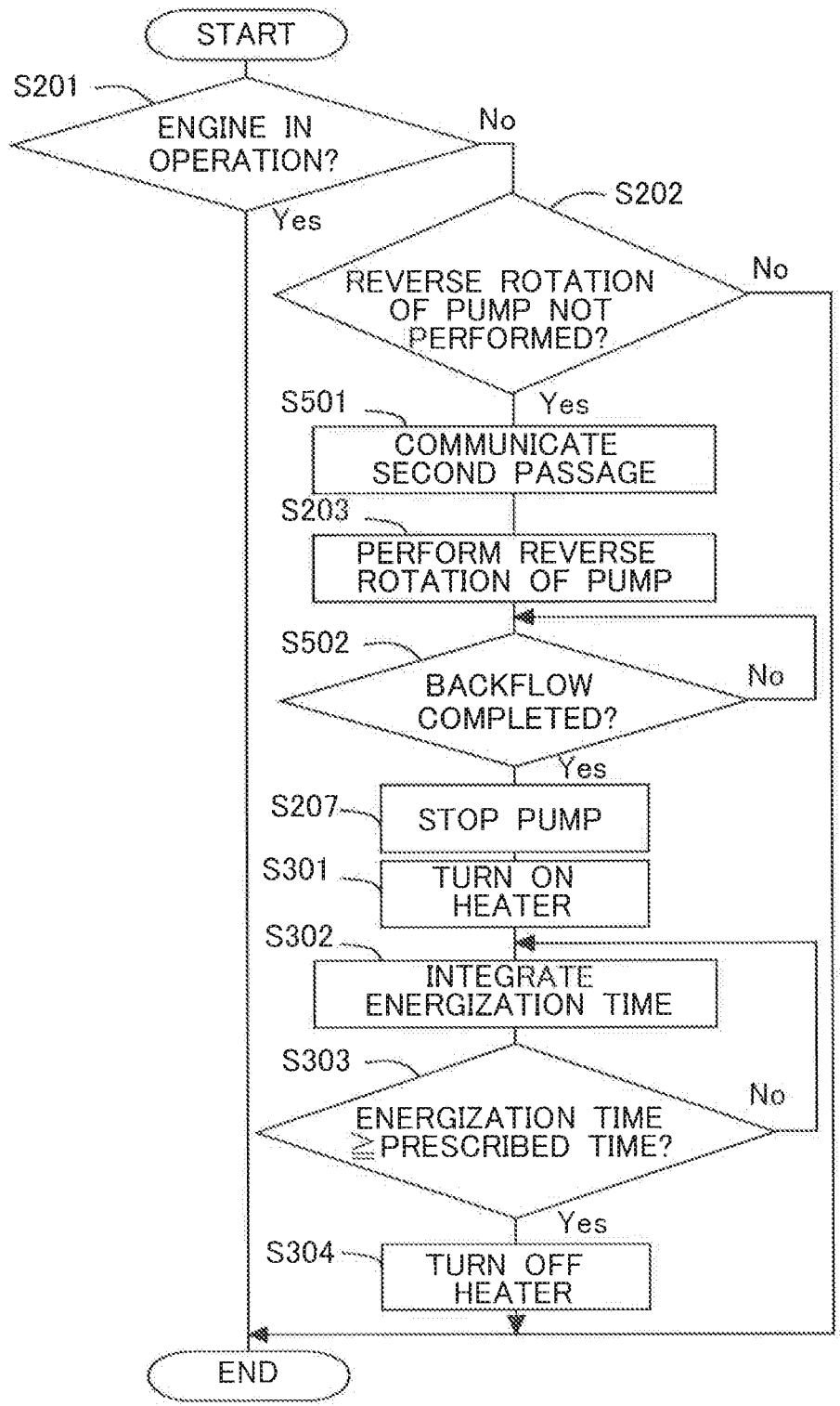
FIG. 10 is a flow chart showing a control flow when energizing a heater after temporarily storing a residual reducing agent in a hydrolysis catalyst according to the second embodiment.

Next, FIG. 10 is a flow chart showing a control flow when energizing the heater 45 after temporarily storing a residual, reducing agent in the hydrolysis catalyst 44 according to the present embodiment. The present flow chart is executed in place or the flow shown in FIG. 9. Moreover, since the respective steps have already been described, a description of the steps will be omitted here.

As described above, according to the present embodiment, since a determination on whether or not to hydrolyze a reducing agent is made in accordance with a temperature inside the exhaust passage 2 when the internal combustion engine 1 is in operation, an appropriate reducing agent can be supplied in accordance with the temperature inside the exhaust passage 2. In addition, when the internal combustion engine 1 is stopped, by causing a backflow of a residual reducing agent to the hydrolysis catalyst 44 to hydrolyze the residual reducing agent, a residual reducing agent not subjected to hydrolysis can be prevented from being injected from the injection valve 42 when the internal combustion engine 1 is next started. In other words, when injecting a reducing agent from the injection valve 42, a reducing agent of a different type to a required reducing agent can be prevented from being injected.

Furthermore, in the configuration described in the first embodiment, even if energization of the heater 45 is stopped, urea may possibly be hydrolyzed more than necessary due to a temperature of the hydrolysis catalyst 44 not dropping immediately. In this case, even when attempting to supply urea, ammonium carbamate or the like may be supplied instead. On the other hand, according to the configuration of the present embodiment, reducing agents may be switched more quickly by switching passages. As a result, a NOx purification rate can be further increased.

Third Embodiment

Figure 11:
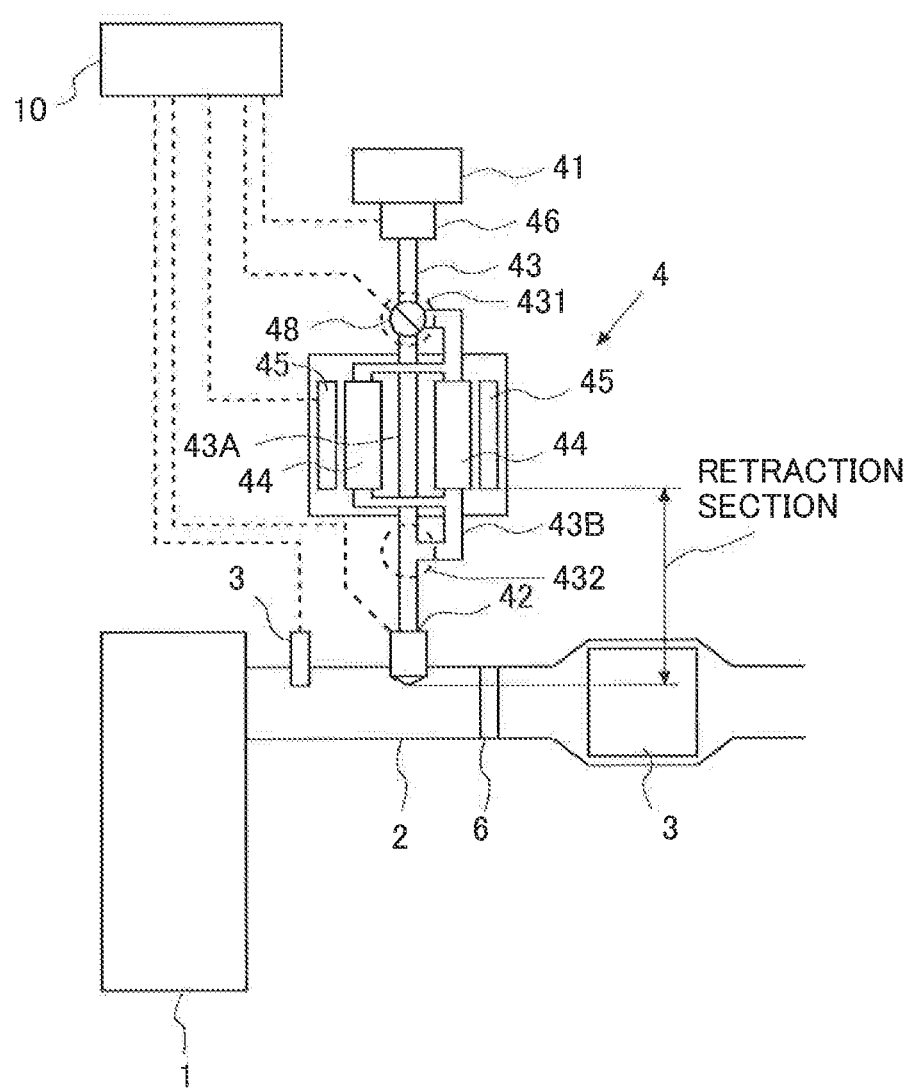
FIG. 11 is a schematic configuration diagram of an exhaust gas purification apparatus of an internal combustion engine when a hydrolysis catalyst is arranged around a first passage.

FIG. 11 is a schematic configuration diagram of an exhaust gas purification apparatus of the internal combustion engine 1 when the hydrolysis catalyst 44 is arranged around the first passage 43A. Differences to the configuration shown in FIG. 7 will be described. The hydrolysis catalyst 44 shown in FIG. 11 is formed in a hollow cylindrical shape and is provided midway along the second passage 43B. In addition, the first passage 43A not provided with the hydrolysis catalyst 44 is arranged on a central axis of the hydrolysis catalyst 44. The heater 45 is arranged along an outer peripheral surface of the hydrolysis catalyst 44. Due to such a configuration, for example, a contact area between the hydrolysis catalyst 44 and a reducing agent can be further increased. In addition, downsizing of the apparatus can be achieved.

Figure 12:
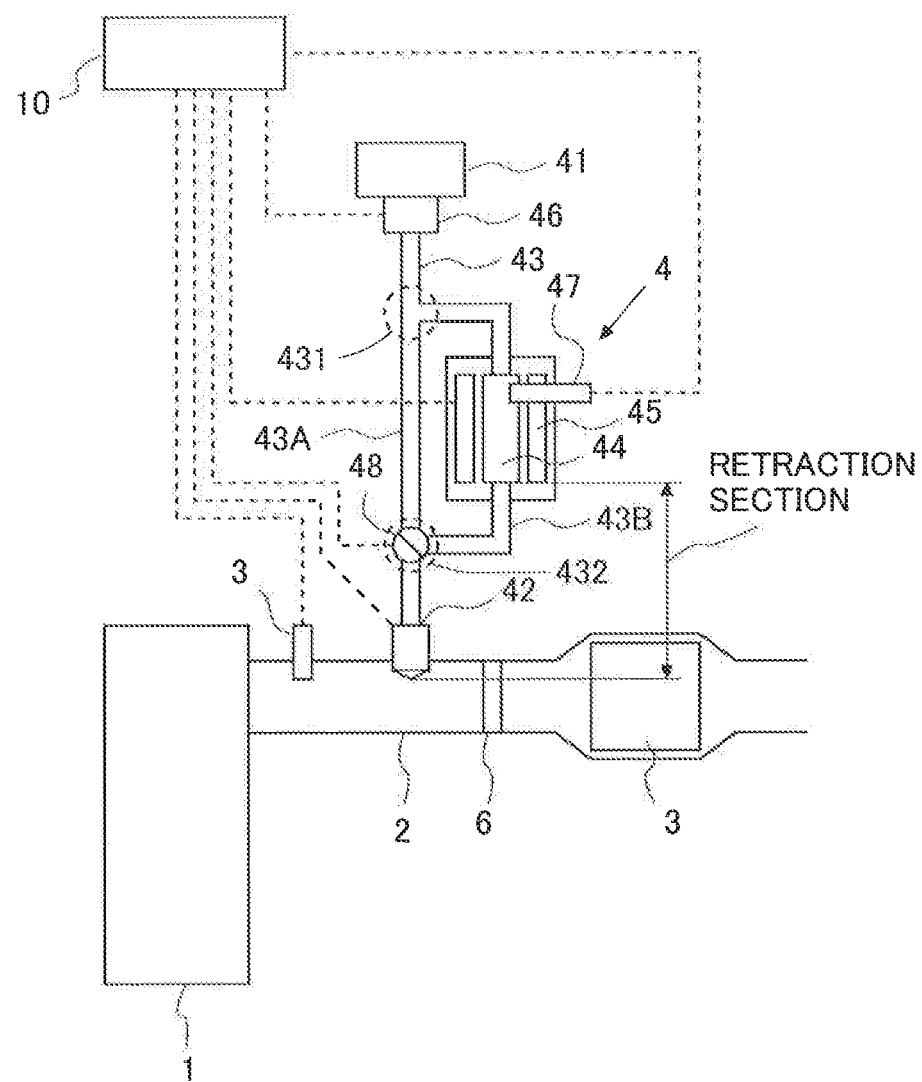
FIG. 12 is a schematic configuration diagram of an exhaust gas purification apparatus of an internal combustion engine when an arrangement of a switching valve is changed.
Figure 13:
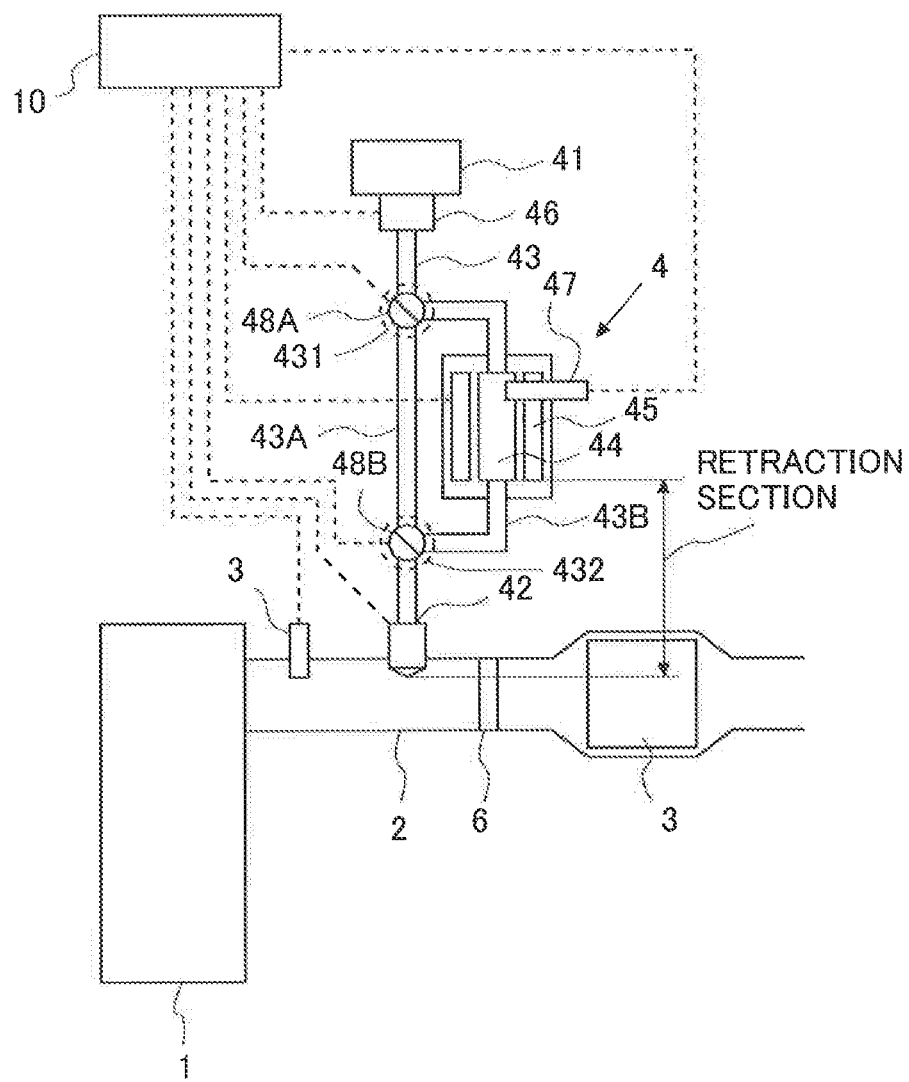
FIG. 13 is a schematic configuration diagram of an exhaust gas purification apparatus of an internal combustion engine when two switching valves are provided.

Furthermore, while the switching valve 48 is provided at the branching part 431 in the configuration described in the second embodiment, alternatively, the switching valve 48 may be provided at the joining part 432 or switching valves may be provided, at the branching part 431 and the joining part 432. FIG. 12 is a schematic configuration diagram of an exhaust gas purification apparatus of the internal combustion engine 1 when an arrangement of the switching valve 48 is changed. In the configuration shown in FIG. 12, the switching valve 48 is arranged at the joining part 432. Otherwise, the configuration is the same as the configuration shown in FIG. 7. In addition, FIG. 13 is a schematic configuration diagram of an exhaust gas purification apparatus of the internal combustion engine 1 when two switching valves are provided. In the configuration shown in FIG. 13, a first switching valve 48A is arranged at the branching part 431 and a second switching valve 48B is arranged at the joining part 432. The first switching valve 48A and the second switching valve 48B are electrically connected to the ECU 10 and are controlled by the ECU 10. Otherwise, the configuration is the same as the configuration shown in FIG. 7. Even when the switching valves 48, 48A, and 48B are arranged in this manner, the present embodiment can be treated in a similar manner to the embodiments described earlier.

Even with the configuration according to the present embodiment described above, a similar effect can be achieved by performing similar control to the first embodiment or the second embodiment.

Figure 14:
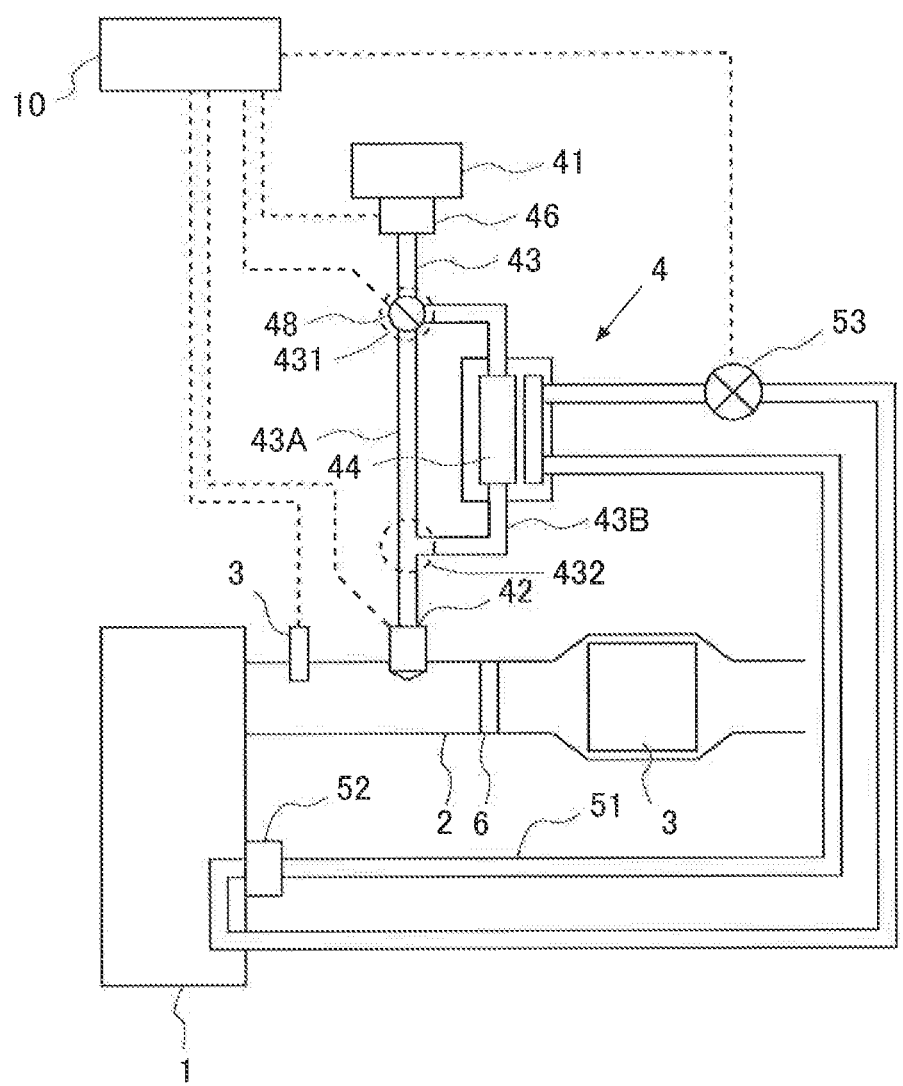
FIG. 14 is a schematic configuration diagram of an exhaust gas purification apparatus of an internal combustion engine when cooling water of the internal combustion engine is circulated around a hydrolysis catalyst.

Moreover, instead of heating the hydrolysis catalyst 44 with the heater 45, the hydrolysis catalyst 44 may be heated by circulating cooling water of the internal combustion engine 1 or a heating medium such as lubricating oil around the hydrolysis catalyst 44. FIG. 14 is a schematic configuration diagram of an exhaust gas purification apparatus of the internal combustion engine 1 when cooling water of the internal combustion engine 1 is circulated, around the hydrolysis catalyst 44. A cooling water passage 51 of the internal combustion engine 1 is formed so as to circle around the hydrolysis catalyst 44. A pump 52 that discharges cooling water is provided in the internal combustion engine 1 and causes cooling water of the internal combustion engine 1 to circulate in the cooling water passage 51. The cooling water passage 51 is formed along an outer peripheral surface of the hydrolysis catalyst 44 so that cooling water flows along the outer peripheral surface of the hydrolysis catalyst 44. A regulating valve 53 to be controlled by the ECU 10 is provided midway along the cooling water passage 51, whereby a temperature of the hydrolysis catalyst 44 is regulated by adjusting an opening of the regulating valve 53. Moreover, instead of heating the hydrolysis catalyst 44 using the heater 45 or a heating medium, the hydrolysis catalyst 44 can be heated using a carrier of the hydrolysis catalyst 44 as a heating body. Otherwise, the configuration is the same as the configuration shown in FIG. 7. Moreover, in the embodiment, the cooling water passage 51, the pump 52, and the regulating valve 53, corresponds to the heater according to the present invention.

In the case of the configuration shown in FIG. 14, a backflow of a reducing agent may be caused to hydrolyze urea when a temperature of cooling water of the internal combustion engine 1, lubricating oil, or the like has reached a temperature at which urea is hydrolyzed or, alternatively, hydrolysis may be performed after waiting for the temperature of cooling water of the internal combustion engine 1 or lubricating oil to reach a temperature at which urea is hydrolyzed and a reducing agent may be subsequently injected from the injection valve 42.

Figure 15:
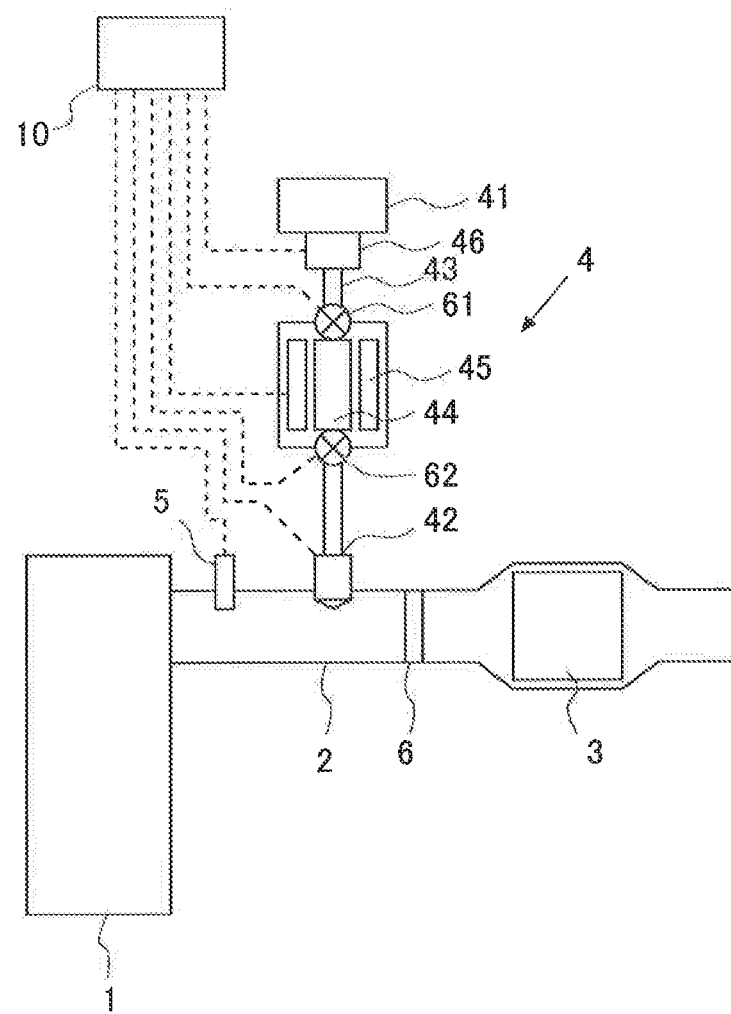
FIG. 15 is a schematic configuration diagram of an exhaust gas purification apparatus of an internal combustion engine when hydrolysis of a reducing agent is performed under pressure.

Next, FIG. 15 is a schematic configuration diagram of an exhaust gas purification apparatus of the internal combustion engine 1 when hydrolysis of a reducing agent is performed under pressure. Differences to FIG. 1 will be described. In the configuration shown in FIG. 15, a first shutoff valve 61 is provided in a vicinity of an end part of the hydrolysis catalyst 44 on a side of the tank 41 and a second shutoff valve 62 is provided in a vicinity of an end part of the hydrolysis catalyst 44 on a side of the injection valve 42. The first shutoff valve 61 and the second shutoff valve 62 are electrically connected to the ECU 10 and are controlled by the ECU 10. Otherwise, the configuration is the same as the configuration shown in FIG. 1.

When performing hydrolysis of a reducing agent in the configuration shown in FIG. 15, first, the first shutoff valve 61 and the second shutoff valve 62 are opened to cause the reducing agent to flow into the hydrolysis catalyst 44, the second shutoff valve 62 is subsequently closed, and a forward rotation of the pump 46 is performed to pressurize the reducing agent in the hydrolysis catalyst 44. When a desired pressure is reached, the first shutoff valve 61 is closed to maintain the pressure inside the hydrolysis catalyst 44. Subsequently, by heating the hydrolysis catalyst 44 with the heater 45, hydrolysis of the reducing agent can be performed under pressure. Once hydrolysis is completed, the first shutoff valve 61 and the second shutoff valve 62 are opened, and a forward rotation of the pump 46 is performed to feed the reducing agent to the injection valve 42. Moreover, even when causing a backflow of the reducing agent to the hydrolysis catalyst 44, by performing similar control after causing a backflow of the reducing agent, the reducing agent can be hydrolyzed under pressure. By performing hydrolysis of a reducing agent under pressure as described above, gasification of the reducing agent can be prevented and, at the same time, hydrolysis of the reducing agent can be performed at a lower temperature.

Moreover, in the present embodiment and the embodiments described earlier, a configuration may be adopted in which, by positioning the hydrolysis catalyst 44 lower than a position of the tank 41 and a position of at least a part of the reducing agent passage 43 located further toward a side of the injection valve 42 than the hydrolysis catalyst 44, a reducing agent is readily accumulated in the hydrolysis catalyst 44 using gravity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An exhaust gas purification apparatus of an internal combustion engine, comprising:
   a selective catalytic reduction NOx catalyst, that is provided in an exhaust passage of the internal combustion engine and that selectively reduces NOx in exhaust gas using a reducing agent;
   a tank that stores a liquid ammonia precursor, which is a reducing agent;
   an injection valve that is provided in an exhaust passage on an upstream side of the selective catalytic reduction NOx catalyst and that injects a reducing agent;

a reducing agent passage that connects the tank and the injection valve with each other;
a hydrolysis catalyst that is provided in the reducing agent passage and that hydrolyzes the ammonia precursor;
a heater configured to heat up the hydrolysis catalyst to a temperature equal to or higher than a hydrolysis temperature at which the ammonia precursor hydrolysis is hydrolyzed;
a pump that discharges a reducing agent; and
a controller comprising at least, one processor configured to control the heater and the pump, wherein
the controller comprising at least one processor configured to control the pump so that, when injecting a reducing agent from the injection valve in a state where the hydrolysis catalyst is at a temperature equal to or higher than the hydrolysis temperature after injecting a reducing agent from the injection valve in a state where the hydrolysis catalyst is at a temperature lower than the hydrolysis temperature, a reducing agent located further toward a side of the injection valve than the hydrolysis catalyst flows toward a side of the hydrolysis catalyst after completion of injection of a reducing agent from the injection valve in a state where the hydrolysis catalyst is at a temperature lower than the hydrolysis temperature and before start of injection of a reducing agent from the injection valve in a state where the hydrolysis catalyst is at a temperature equal to or higher than the hydrolysis temperature.

2. The exhaust gas purification apparatus of an internal combustion engine according to claim 1, wherein the controller comprising at least one processor configured to perform heating of the hydrolysis catalyst with the heater when the temperature inside the exhaust passage is lower than at prescribed temperature and does not perform heating of the hydrolysis catalyst with the heater when the temperature inside the exhaust passage is equal to or higher than the prescribed temperature.

3. The exhaust gas purification apparatus of an internal combustion engine according to claim 1, wherein when the controller controls the pump so that a reducing agent located further toward a side of the injection valve than the hydrolysis catalyst flows toward the hydrolysis catalyst, the controller comprising at least one processor configured to operate the pump until all the reducing agent located further toward the side of the injection valve than the hydrolysis catalyst moves to a side of the tank from a hydrolysis catalyst including the hydrolysis catalyst.

4. The exhaust gas purification apparatus of an internal combustion engine according to claim 1, wherein
the reducing agent passage includes a first passage and a second passage which branch at a branching part and which join at a joining part,
the hydrolysis catalyst is provided in the second passage,
at least one of the branching part and the joining part has a switching valve which switches a flow path of a reducing agent,
the controller comprising at least one processor configured to control the switching valve and perform heating of the hydrolysis catalyst by the heater when the temperature inside the exhaust passage is lower than a prescribed temperature so that a reducing agent flows through the second passage, and moreover control the switching valve when a temperature inside the exhaust passage is equal to or higher than the prescribed temperature so that a reducing agent flows through the first passage, and
when injecting a reducing agent from the injection valve in a state where the hydrolysis catalyst is at a temperature equal to or higher than the hydrolysis temperature after injecting a reducing agent from the injection valve in a state where the hydrolysis catalyst is at a temperature lower than the hydrolysis temperature, the controller further comprising at least one processor configured to control the switching valve so that a reducing agent flows through the second passage and control the pump so that a reducing agent located further toward a side of the injection valve than the joining part flows into at least the hydrolysis catalyst after completion of injection of a reducing agent from the injection valve in a state where the hydrolysis catalyst is at a temperature lower than the hydrolysis temperature and before start of injection of a reducing agent from, the injection valve in a state where the hydrolysis catalyst is at a temperature equal to or higher than the hydrolysis temperature.

5. The exhaust, gas purification apparatus of an internal combustion engine according to claim 4, wherein the controller comprising at least one processor configured to heat the hydrolysis catalyst by the heater when controlling the pump so that a reducing agent located further toward a side of the injection, valve than the hydrolysis catalyst flows toward a side of the hydrolysis catalyst.

6. The exhaust gas purification apparatus of an internal combustion engine according to claim 1, wherein the controller comprising at least one processor configured to control the pump so that a reducing agent located further toward a side of the injection valve than the hydrolysis catalyst flows toward a side of the hydrolysis catalyst during a cold start of the internal combustion engine.

* * * * *